(12) United States Patent
Chung et al.

(10) Patent No.: US 7,965,924 B2
(45) Date of Patent: Jun. 21, 2011

(54) STORAGE MEDIUM FOR RECORDING SUBTITLE INFORMATION BASED ON TEXT CORRESPONDING TO AV DATA HAVING MULTIPLE PLAYBACK ROUTES, REPRODUCING APPARATUS AND METHOD THEREFOR

(75) Inventors: Hyun-Kwon Chung, Seoul (KR); Sung-Wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 816 days.

(21) Appl. No.: 10/573,878

(22) PCT Filed: Sep. 24, 2004

(86) PCT No.: PCT/KR2004/002481
§ 371 (c)(1),
(2), (4) Date: Sep. 26, 2007

(87) PCT Pub. No.: WO2005/031739
PCT Pub. Date: Apr. 7, 2005

(65) Prior Publication Data
US 2008/0187286 A1    Aug. 7, 2008

(30) Foreign Application Priority Data

Sep. 30, 2003  (KR) .................. 10-2003-0067919
Jan. 20, 2004  (KR) .................. 10-2004-0004442

(51) Int. Cl.
*H04N 5/783*  (2006.01)
(52) U.S. Cl. ...................... 386/344; 386/343
(58) Field of Classification Search ............. 386/95, 386/46, 68, 69, 52, 343, 344, 351, 353, 239, 386/248
See application file for complete search history.

(56) References Cited

U.S. PATENT DOCUMENTS

| 5,497,241 | A | 3/1996 | Ostrover et al. |
| 6,345,147 | B1 | 2/2002 | Mimura et al. |
| 7,356,248 | B2 * | 4/2008 | Bae et al. ............... 386/95 |
| 2001/0053280 | A1 | 12/2001 | Yamauchi et al. |
| 2003/0039469 | A1 | 2/2003 | Kim |
| 2003/0099464 | A1 * | 5/2003 | Oh et al. ............... 386/95 |
| 2005/0058435 | A1 * | 3/2005 | Chung et al. ........... 386/95 |
| 2005/0078947 | A1 * | 4/2005 | Chung et al. ........... 386/95 |

FOREIGN PATENT DOCUMENTS

| JP | 2000-163933 | 6/2000 |
| KR | 10-2000-0074305 | 12/2000 |

OTHER PUBLICATIONS

PCT International Search Report dated Dec. 21, 2004 re: International Application No. PCT/KR2004/002481 (3 pp). Korean Office Action issued on May 13, 2010, in corresponding Korean Patent Application No. 10-2004-0004442 (4 pages).

* cited by examiner

*Primary Examiner* — Robert Chevalier
(74) *Attorney, Agent, or Firm* — NSIP Law

(57) ABSTRACT

A storage medium for recording subtitle information based on text corresponding to moving picture data having a plurality of playback routes and an apparatus for and a method of reproducing an image including subtitles corresponding to the data. The storage medium includes moving picture data having a plurality of playback routes; a plurality of subtitle data items corresponding to the playback routes and supporting random search for a subtitle; and mapping information linking the moving picture data and the subtitle data. Accordingly, compatibility with a bitmap image method that is a subtitle processing method of a DVD or a bluray disc can be maintained, and multiple story playback is enabled. When random search or playback is performed, the search time for subtitle data is reduced such that search efficiency is enhanced.

21 Claims, 22 Drawing Sheets

- POSITION INFORMATION OF SUBTITLE TO BE DISPLAYED ON SCREEN/LANGUAGE CODE/ISRC
- REFERENCE OFFSET INFORMATION FOR BEGINNING TO DISPLAY SUBTITLE
- TIME INFORMATION SYNCHRONIZING SUBTITLE WITH VIDEO/ TEXT INFORMATION UNIT AS SUBTITLE CONTENTS

FIG. 12

```
<subtitle-mapping-data type="dvd-video" lang="en-us" caption="English caption"
font="http://www.font.com/download/arial.ttf"  Isrc="  ISRC  FR-Z03-98-00212"
streamId="32">
<dvd-video>
<palette>
        <color index="0" yuv="296ef0" />
        <color index="1" yuv="108080" />
        <color index="2" yuv="3b8080" />
        <color index="3" yuv="668080" />
        <color index="4" yuv="918080" />
        <color index="5" yuv="bc8080" />
        <color index="6" yuv="eb8080" />
        <color index="7" yuv="108080" />
        <color index="8" yuv="108080" />
        <color index="9" yuv="108080" />
        <color index="10" yuv="108080" />
        <color index="11" yuv="108080" />
        <color index="12" yuv="108080" />
        <color index="13" yuv="108080" />
        <color index="14" yuv="108080" />
        <color index="15" yuv="108080" />
</palette>
<vmg>
        <vmgm_vobs>
                <subtitle vob_idn="1" href="file://engish_vmgm.text" />  —— 1202
        </vmgm_vobs>
</vmg>
<vts idn="1">
        <vtsm_vobs>
                <subtitle vob_idn="1" href=" file://english_vtsm.text" />  —— 1204
        </vtsm_vobs>
        <vtstt_vobs>
                <subtitle vob_idn="1-9" href=" file://english_tt1vob1.text" />   ⎫
                <subtitle vob_idn="10-49" href=" file://english_tt1vob10.text" /> ⎬ 1206
                <subtitle vob_idn="50-100" href=" file://english_tt1vob50.text" /> ⎭
        </vtstt_vobs>
</vts>
</dvd-video>
</subtitle-mapping-data>
```

FIG. 13

| LANGUAGE (EXAMPLE. en-us) | | |
|---|---|---|
| SUBTITLE TITLE (EXAMPLE. English caption) | | |
| FONT INFORMATION (EXAMPLE, http://www.font.com/downlocd/arial.tff) | | |
| ISRC (EXAMPLE, ISRC FR-Z03-98-00212) | | |
| PALETTE INFORMATION | | |
| STREAM ID INFORMATION | | |
| VOBS INDICATION INFORMATION (EXAMPLE, VMGM_VOBS) | VOB INDICATION INFORMATION(1) | SUBTITLE DATA POSITION INFORMATION (EXAMPLE, file://english_vmgm.txt) 1302 |
| VOBS INDICATION INFORMATION (EXAMPLE, VTSM_VOBS) | VOB INDICATION INFORMATION(1) | SUBTITLE DATA POSITION INFORMATION (EXAMPLE, file://english_vtsm.text) 1304 |
| VOBS INDICATION INFORMATION (EXAMPLE, VTSTT_VOBS) | VOB INDICATION INFORMATION(1-9) | SUBTITLE DATA POSITION INFORMATION (EXAMPLE, file://english_tt1vob1.text) |
| VOBS INDICATION INFORMATION (EXAMPLE, VTSTT_VOBS) | VOB INDICATION INFORMATION(10-49) | SUBTITLE DATA POSITION INFORMATION (EXAMPLE, file://english_tt1vob10.text) 1306 |
| VOBS INDICATION INFORMATION (EXAMPLE, VTSTT_VOBS) | VOB INDICATION INFORMATION(50-100) | SUBTITLE DATA POSITION INFORMATION (EXAMPLE, file://english_tt1vob50.text) |

FIG. 16

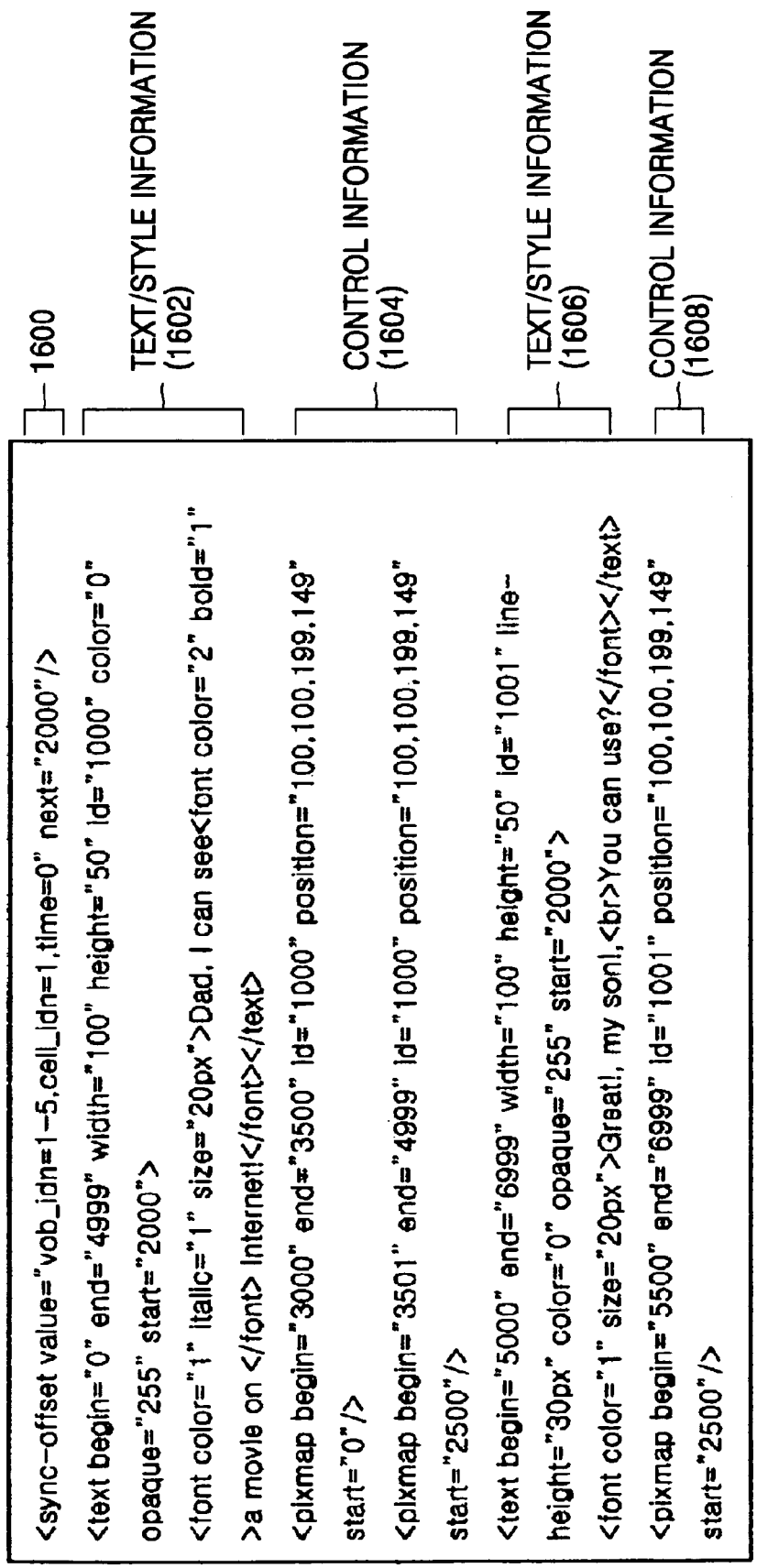

```
<sync-offset value="vob_idn=1-5,cell_idn=1,time=0" next="2000"/>
<text begin="0" end="4999" width="100" height="50" id="1000" color="0" opaque="255" start="2000">
<font color="1" italic="1" size="20px">Dad, I can see<font color="2" bold="1">a movie on </font> Internet!</font></text>
<pixmap begin="3000" end="3500" id="1000" position="100,100,199,149" start="0"/>
<pixmap begin="3501" end="4999" id="1000" position="100,100,199,149" start="2500"/>
<text begin="5000" end="6999" width="100" height="50" id="1001" line-height="30px" color="0" opaque="255" start="2000">
<font color="1" size="20px">Great!, my son!,<br>You can use?</font></text>
<pixmap begin="5500" end="6999" id="1001" position="100,100,199,149" start="2500"/>
```

- 1600
- TEXT/STYLE INFORMATION (1602)
- CONTROL INFORMATION (1604)
- TEXT/STYLE INFORMATION (1606)
- CONTROL INFORMATION (1608)

FIG. 19

```
<subtitle-mapping-data type="blu-ray-video" lang="en-us" caption="English caption">
<blu-ray-video>
font="http://www.font.com/download/arial.ttf" isrc=" ISRC FR-Z03-98-00212" pid="32">
<dvd-video>
<subtitle clip_idn="0001.clpi" href="english_0001.text" />  ⎫
<subtitle clip_idn="0002.clpi" href="english_0002.text" />  ⎬ 1902
<subtitle clip_idn="0003.clpi" href="english_0003.text" />  ⎭
</blu-ray-video>
</subtitle-mapping-data>
```

FIG. 20

| LANGUAGE (EXAMPLE, en-us) | |
|---|---|
| SUBTITLE TITLE (EXAMPLE, English caption) | |
| FONT INFORMATION (EXAMPLE, http://www.font.com/downlocd/arial.tff) | |
| ISRC (EXAMPLE에, ISRC FR-Z03-98-00212) | |
| PID INFORMATION | |
| CLIP INDICATION INFORMATION (0001.clipi) | SUBTITLE DATA POSITION INFORMATION |
| | (EXAMPLE, file://english_001.text) |
| CLIP INDICATION INFORMATION (0001.clipi) | SUBTITLE DATA POSITION INFORMATION |
| | (EXAMPLE, file://english_002.text) |
| CLIP INDICATION INFORMATION (0001.clipi) | SUBTITLE DATA POSITION INFORMATION |
| | (EXAMPLE, file://english_003.text) |

2002 brackets the last three clip/subtitle rows.

FIG. 23

```
<subtitle-data isrc FR-Z03-98-00212" lang="eb-us">
<sync-offset value="0" next="20000"/>
<palette id="1">
    <color index="0" yuv="296efoff"/>
    <color index="1" yuv="10808off"/>
    <color index="2" yuv="3b808off"/>
    <color index="3" yuv="66808off"/>
    <color index="4" yuv="91808off"/>
    <color index="5" yuv="bc808off"/>
</palette>
<text begin="0" end="4999" width="100" height="5-" id="1000" color="0" start="2000">
<font color="1" italic="1" size="20px">Dad, I can see<font color="2" bold="1">a movie on </font> Internet </font></text>
<composition begin="3000" end="4999" palette="1">
    <pixmap id="1000" position="100.100" cropping="0.0.100.50"/>
    <pixmap id="1000" position="300.300" cropping="0.25.100.25"/>
</composition>
<text begin="5000" end="6999" width="100" height="50" id="1001" line-height="30px" color="0" start="2000">
<font color="1" size="20px">Great! my son!<br>You can use?</font></text>
<pixmap position="100.100" cropping="0.0.100.50"/>
</composition>
</sublitle-data>
```

Annotations (right side, top to bottom):
- TEXT/STYLE INFORMATION (2302)
- CONTROL INFORMATION (2304)
- TEXT/STYLE INFORMATION (2306)
- CONTROL INFORMATION (2308)

STORAGE MEDIUM FOR RECORDING SUBTITLE INFORMATION BASED ON TEXT CORRESPONDING TO AV DATA HAVING MULTIPLE PLAYBACK ROUTES, REPRODUCING APPARATUS AND METHOD THEREFOR

CROSS-REFERENCE TO RELATED APPLICATIONS

This application claims the benefit of PCT International Patent Application No. PCT/KR2004/002481, filed Sep. 24, 2004, Korean Patent Application No. 2004-4442, filed Jan. 20, 2004, in the Korean Intellectual Property Office, and Korean Patent Application No. 2003-67919, filed Sep. 30, 2003, in the Korean Intellectual Property Office, the disclosures of which are incorporated herein by reference.

BACKGROUND OF THE INVENTION

1. Field of the Invention

General aspects of examples described herein relate to reproduction of a storage medium recording moving picture data, and more particularly, to a storage medium recording subtitle information compatible with a subpicture method of a digital versatile disc (DVD) and a presentation method of a bluray disc, and based on text corresponding to moving picture data having a plurality of playback routes. Other general aspects of examples described herein relate to an apparatus for and a method of reproducing a moving picture from the moving picture data on the storage medium.

2. Description of the Related Art

Among conventional text-based subtitle technologies are Synchronized Accessible Media Interchange (SAMI) technology of Microsoft Corporation and Real-text technology of RealNetwork, Inc. These conventional text-based subtitle technologies are based on a video stream data file recorded on a storage medium or a video stream data file provided on a network, and have a structure in which a subtitle is output based on synchronization time information with video data.

FIG. 1 is a reference diagram explaining the conventional text-based subtitle technology. Referring to FIG. 1, a text-based subtitle file, corresponding to video stream data, and based on synchronization time information is included in a subtitle file. For example, at <sync time 00:05>, a subtitle corresponding to video stream data is output. That is, the conventional text-based subtitle information provides a subtitle file structure constructed assuming that continuous video data is reproduced.

FIG. 2 is a reference diagram explaining problems of the conventional text-based subtitle technology. Referring to FIG. 2, with the conventional text-based subtitle file structure, when a multiple story video having a plurality of playback routes is reproduced according to a user input, processing subtitles according to alternate routes of the multiple story video is impossible using the synchronization time information as shown in FIG. 2. That is, only story route A can be reproduced, and story route B cannot be reproduced.

In addition, the conventional text-based subtitle data is not compatible with subtitle data based on a bitmap image such as a subpicture method of a DVD or a presentation method of a bluray disc.

SUMMARY OF THE INVENTION

To solve the above and/or other problems, general aspects of examples described herein may provide a storage medium recording subtitle information compatible with a subpicture method of a DVD and a presentation method of a bluray disc, based on text corresponding to moving picture data having a plurality of playback routes. Additional general aspects of examples described herein may provide an apparatus for reproducing and a method of reproducing compatible with the subpicture method of the DVD and the presentation method of the bluray disc.

According to one general aspect, a storage medium includes: moving picture data having a plurality of playback routes; a plurality of subtitle data items corresponding to the playback routes and supporting random search for a subtitle; and mapping information linking the moving picture data and the subtitle data.

The subtitle data may include reference offset information indicating reference information to randomly search for a subtitle of a desired time at a high speed and reproduce the subtitle, text data containing subtitle contents that are converted into pixel data and output, style information specifying an output style of the pixel data, and control information to control the output of the converted pixel data.

By using information on a time elapsed from the reference offset information, the subtitle of a desired time may be randomly searched for at a high speed among the subtitle data. The reference offset information may include a cell identifier (VOB_ID and CELL_ID) of a video object that is a recording unit of the storage medium, or a start position of a clip that is a recording unit of the storage medium.

The subtitle data may be described in a form of a markup language or a form of a binary table. In the subtitle data described in the form of the binary table, the style information, the control information, and the text information may have respective identifiers for distinguishing each other, and the control information may include indication information indicating the style information and the text information corresponding to the control information, and in order to reduce a search time by integer calculation when random search is performed, the size of each of the style information and the control information may be predetermined and sequentially recorded in a predetermined area.

The style information may include at least one among information items on the width and height of the pixel data area, a background color, a time when the pixel data is to be stored and deleted in a buffer memory, a starting point from which subtitle text is rendered, line spacing, output direction, bold type and Italic type of subtitle text, line break, color of subtitle text, and information on character code encoding. As used herein, an expression of the form at least one among A, B, and C includes A or B or C, A and B, A and C, B and C, and A and B and C.

The control information may include at least one among information items on an area on which the pixel data is to be output on the entire screen, a start point of subtitle text in the pixel data output area, and a synchronization time indicating when the pixel data is to appear and disappear in synchronization with the moving picture data.

The synchronization time information may be expressed as a lapse time from a reference cell (CELL) of a video object (VOBU) that is reference offset information of the moving picture data, or as a lapse time from a start position of a clip that is reference offset information of the moving picture data.

The synchronization time information may be expressed by using a present time stamp (PTS) time based on a reference time for reproducing moving pictures.

The subtitle data or mapping information may further include at least one among font information describing the font of subtitle data to be displayed on the screen, information on a producer making the subtitle, packet identifier (PID) information of the subtitle data to distinguish from the moving picture data, and subtitle indication information by language of the subtitle data.

According to another general aspect, a reproducing apparatus for reproducing a storage medium on which moving picture data is recorded includes: a decoder decoding moving picture data having a plurality of playback routes; and a subtitle processor converting subtitle data, corresponding to a predetermined route and selected by using a plurality of subtitle data items corresponding to the playback routes and supporting random search for a subtitle and mapping information linking the moving picture data and the subtitle data, into pixel data, synchronizing the converted pixel data with the moving picture data, and outputting the pixel data.

The subtitle processor may include: a text subtitle decoder identifying subtitle data corresponding to the moving picture data of a route to be reproduced by parsing the mapping information, and converting the identified subtitle data into pixel data by parsing the subtitle data; and a graphic controller controlling the pixel data by using the parsed mapping information and subtitle data such that the pixel data is synchronized with the moving picture data and output.

In the subtitle data, by decoding the subtitle data, the text subtitle decoder may parse reference offset information indicating reference information to randomly search for a subtitle of a desired time at a high speed and reproduce the subtitle, text data containing subtitle contents that are converted into pixel data and output, style information specifying an output style of the pixel data, and control information to control the output of the converted pixel data, and based on the style information, convert the text data into pixel data, and by using the parsed control information, the graphic controller may control such that the converted pixel data is synchronized with the moving picture data and output.

The text subtitle decoder may randomly search the subtitle data for the subtitle of a desired time at a high speed by using information on a time elapsed from the reference offset information.

By using synchronization time information expressed as a lapse time from a reference cell (CELL) of a video object (VOBU) that is reference offset information of the moving picture data, or as a lapse time from a start position of a clip that is reference offset information of the moving picture data, the graphic controller may control the converted pixel data to be synchronized with the moving picture data and output.

According to yet another general aspect, a method of reproducing data on a storage medium storing moving picture data having a plurality of playback routes, a plurality of subtitle data items corresponding to the playback routes and supporting random search for a subtitle, and mapping information linking the moving picture data and the subtitle data, includes: reading the subtitle data corresponding to moving picture data of a route to be reproduced by parsing the mapping information; identifying subtitle data of a position to be reproduced according to continuous reproduction or reproduction by random search, by parsing the subtitle data, and converting the subtitle data into pixel data; and synchronizing the converted pixel data with the moving picture data and outputting the pixel data.

By using the mapping information and the subtitle data file structure according to general aspects of the examples described herein, subtitle information compatible with a bitmap image method such as the subpicture method of a DVD and the presentation method of a bluray disc, and based on text corresponding to moving picture data having a plurality of playback routes, can be provided.

Further, by including reference offset information in a subtitle data file, when random search or reproduction is performed, the time for searching for a subtitle can be reduced such that search efficiency is enhanced.

Additional aspects and/or features will be set forth in part in the description which follows and, in part, will be obvious from the description, or may be learned by practice of the invention.

BRIEF DESCRIPTION OF THE DRAWINGS

These and/or other aspects and features will become apparent and more readily appreciated from the following description, taken in conjunction with the accompanying drawings of which:

FIG. 12 is a diagram showing an example of the mapping information shown in FIG. 11 implemented by using a markup language on a DVD disc;

FIG. 13 is a diagram showing an example of the mapping information shown in FIG. 11 described in the form of a table implemented on a DVD disc;

FIG. 16 is a diagram showing an example of the subtitle data shown in FIG. 6 implemented by a markup language on a DVD disc;

FIG. 19 is a diagram showing an example of the mapping information shown in FIG. 18 implemented by using a markup language on a bluray disc;

FIG. 20 is a diagram showing an example of the mapping information shown in FIG. 18 implemented in a table on a bluray disc;

FIG. 23 is a diagram showing an example of the subtitle data shown in FIG. 6 implemented by a markup language on a bluray disc.

DETAILED DESCRIPTION

Figure 1:
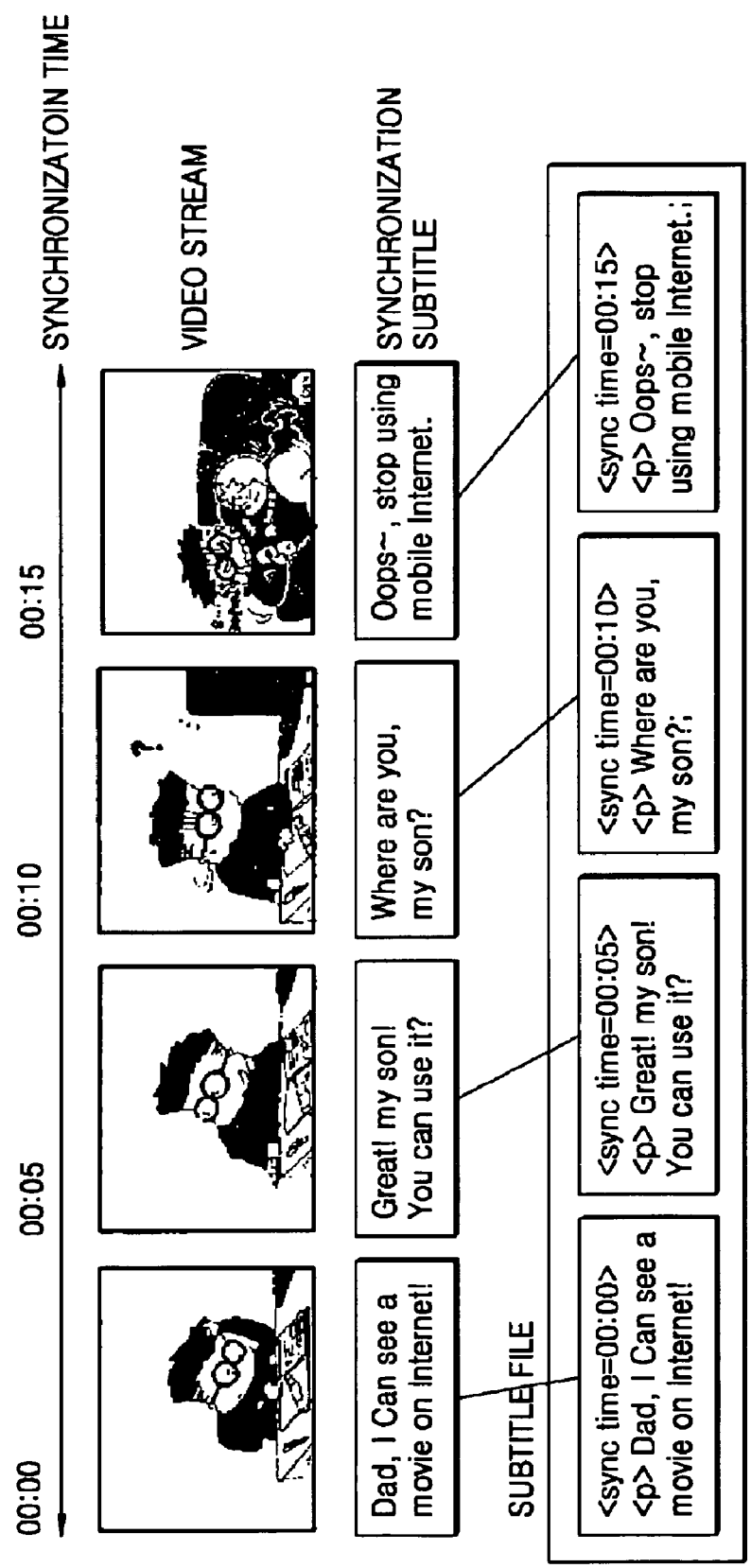
FIG. 1 is a reference diagram explaining a conventional text-based subtitle technology.
Figure 2:
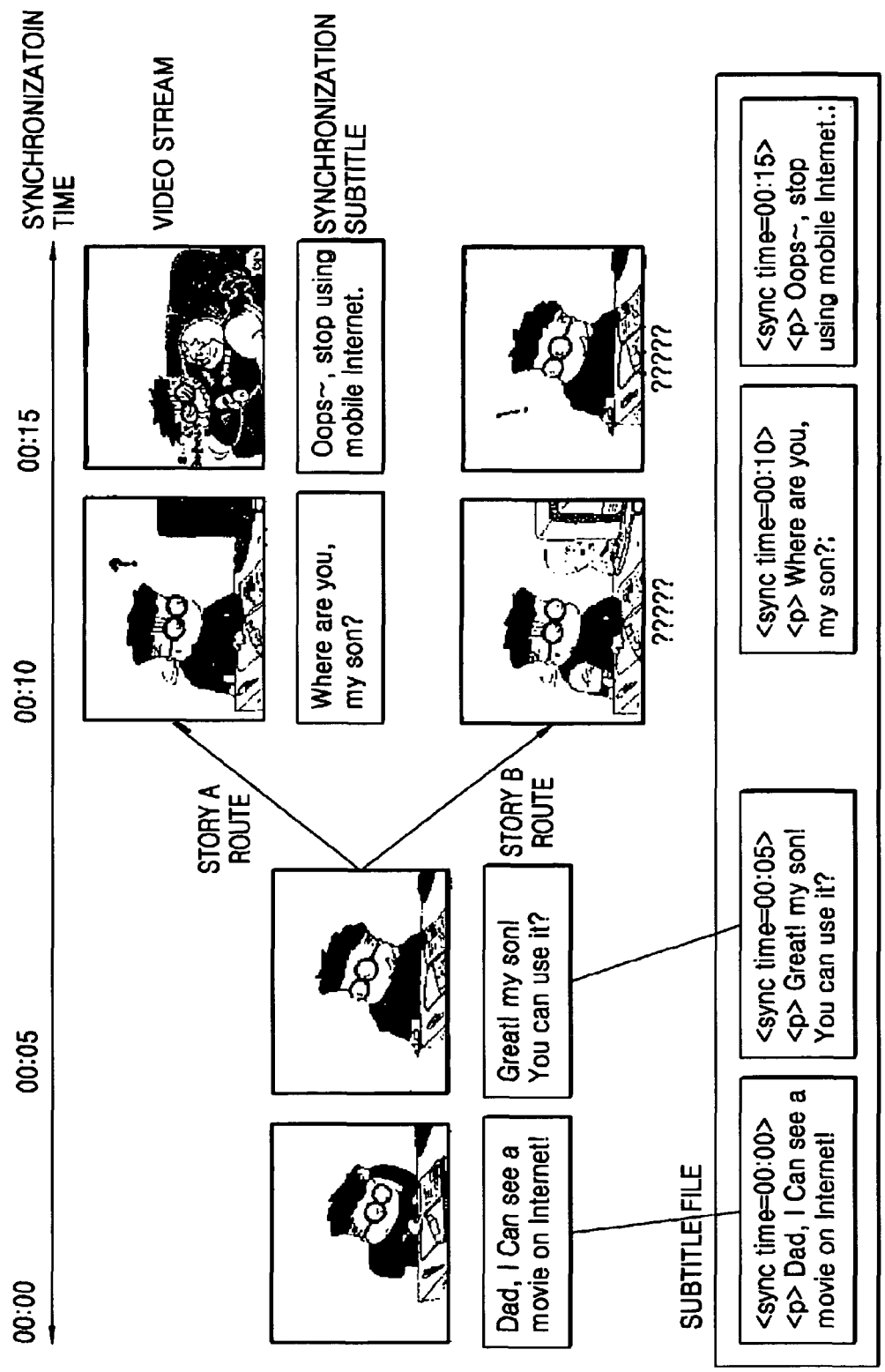
FIG. 2 is a reference diagram explaining problems of the conventional text-based subtitle technology illustrated in FIG. 1.

Reference will now be made in detail to examples which are illustrated in the accompanying drawings, wherein like reference numerals refer to the like elements throughout. The examples are described below by referring to the figures.

FIGS. 3 through 7 are diagrams explaining examples of mapping information of moving picture data and subtitle data having a plurality of playback routes and the structure of subtitle data.

Figure 8:
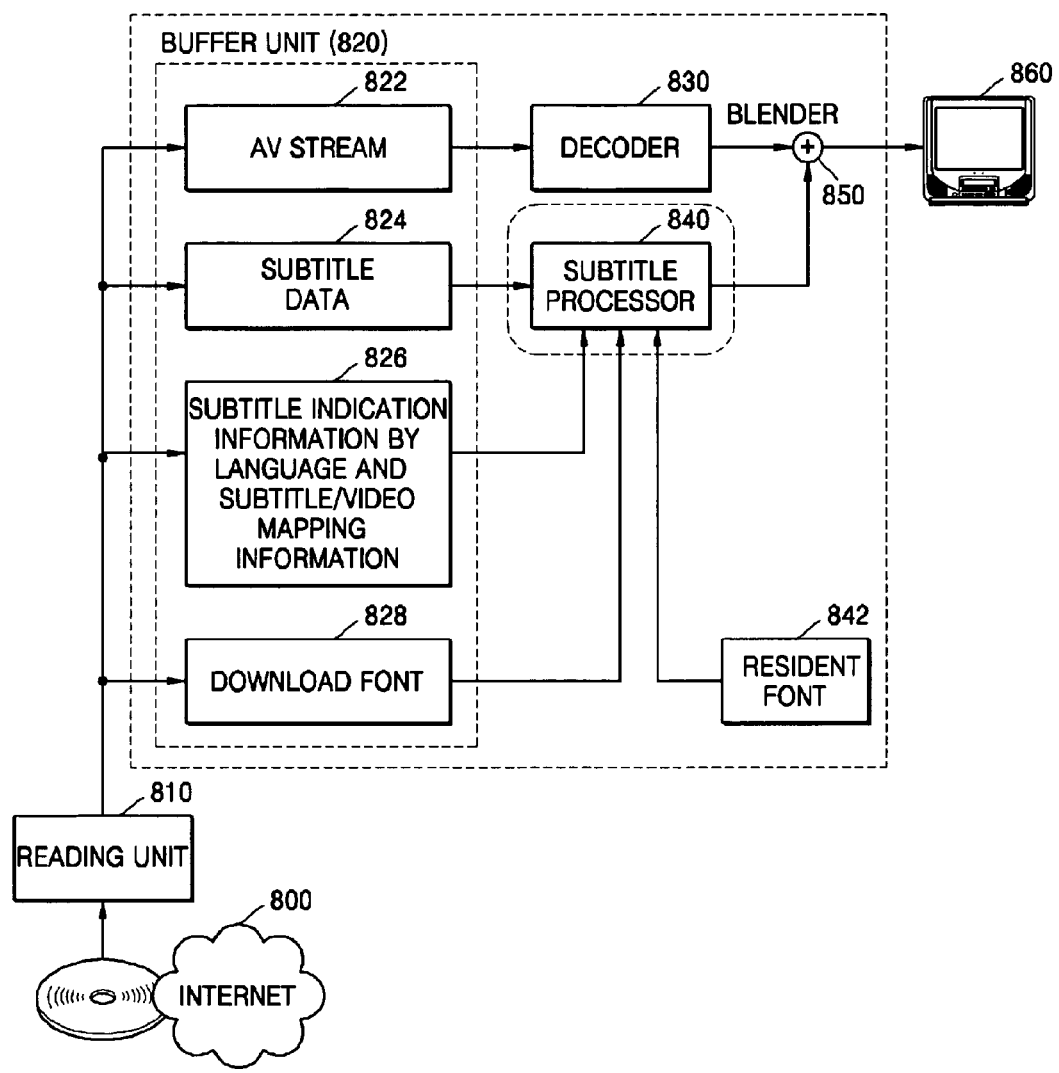
FIG. 8 is a diagram illustrating an example that explains a structure of a reproducing apparatus.
Figure 9:
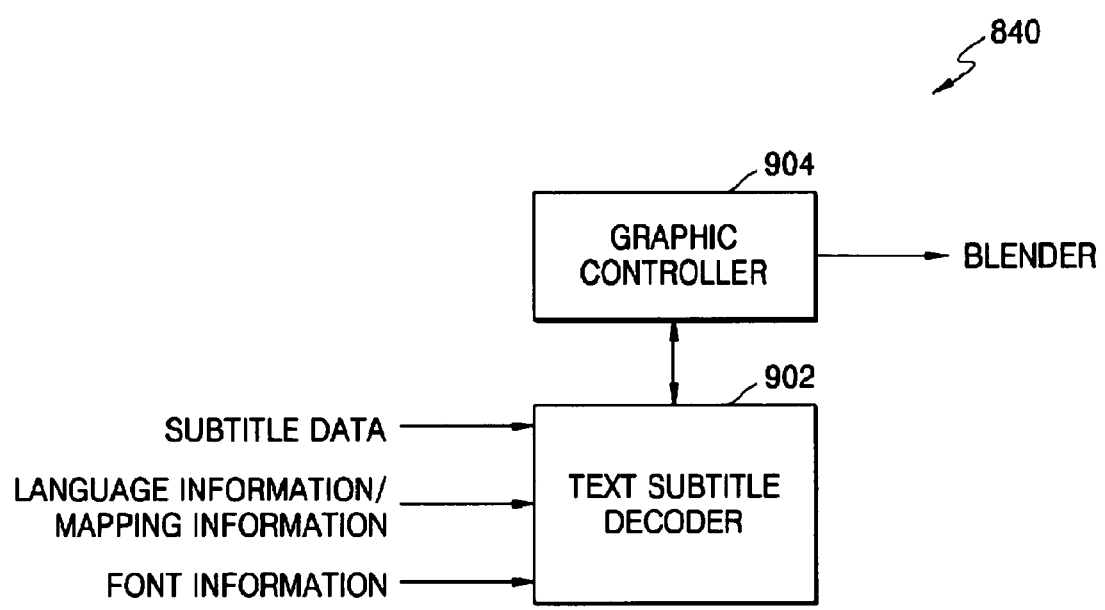
FIG. 9 is a diagram explaining an example of a structure of the subtitle processor shown in FIG. 8.
Figure 10:
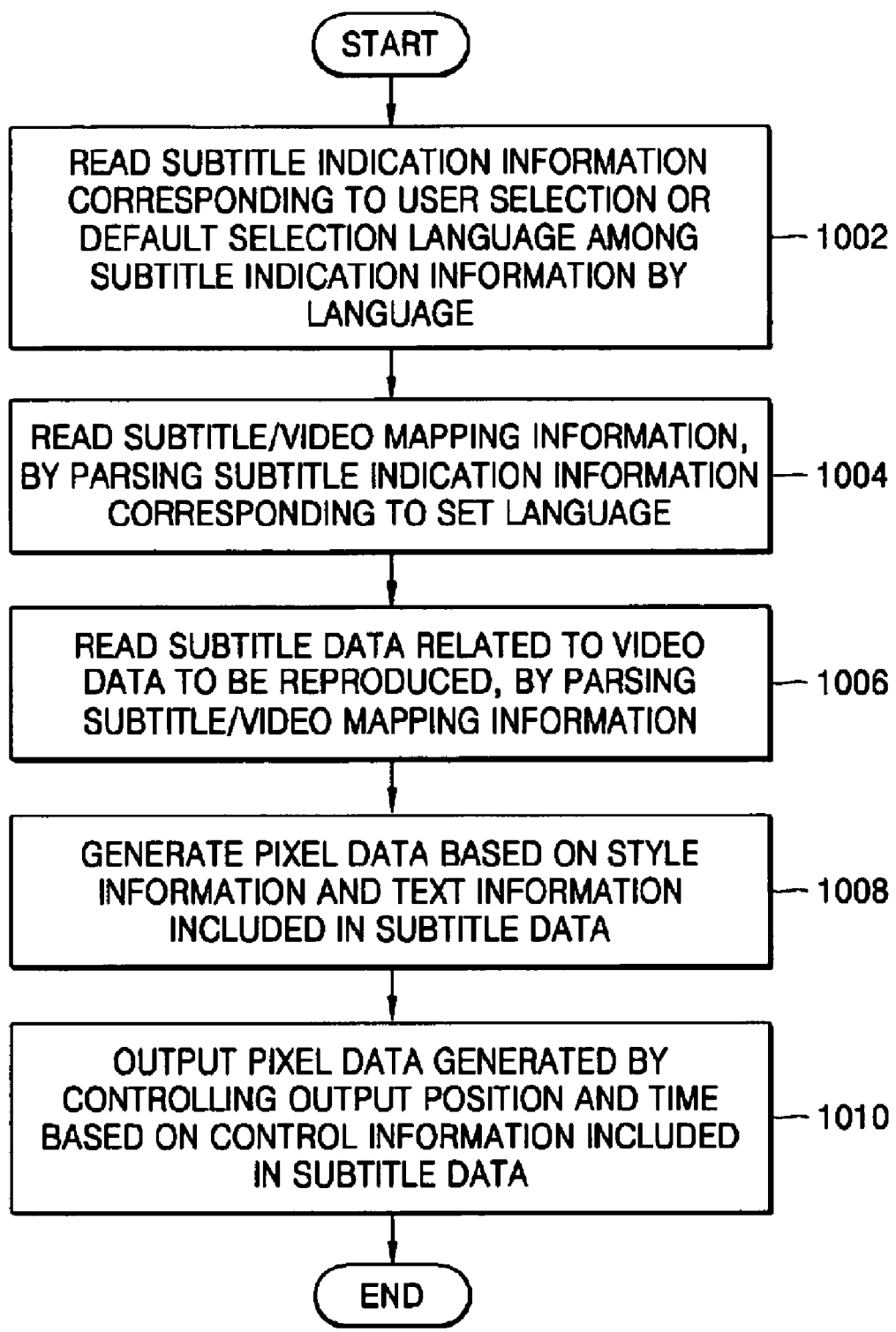
FIG. 10 is a flowchart illustrating an example of a method of reproducing subtitle information based on text corresponding to moving picture data having a plurality of playback routes.

FIGS. 8 and 9 are diagrams explaining examples of a structure of a reproducing apparatus, and FIG. 10 is a flowchart illustrating an example of a method of reproducing subtitle data.

FIGS. 11 through 17 are diagrams explaining an example of the mapping information and subtitle data implemented on a DVD disc.

FIGS. 18 through 24 are diagrams explaining an i example of mapping information and subtitle data implemented on a bluray disc.

A storage medium recording text-based subtitle information corresponding to moving picture data having a plurality of playback routes, and a reproducing apparatus and a reproducing method therefor will now be explained. The storage medium comprises a structure including moving picture data having a plurality of playback routes for multiple story playback, a plurality of subtitle data items corresponding to the plurality of playback routes and supporting random search for a subtitle, and mapping information linking the moving picture data and the subtitle data.

Figure 3:
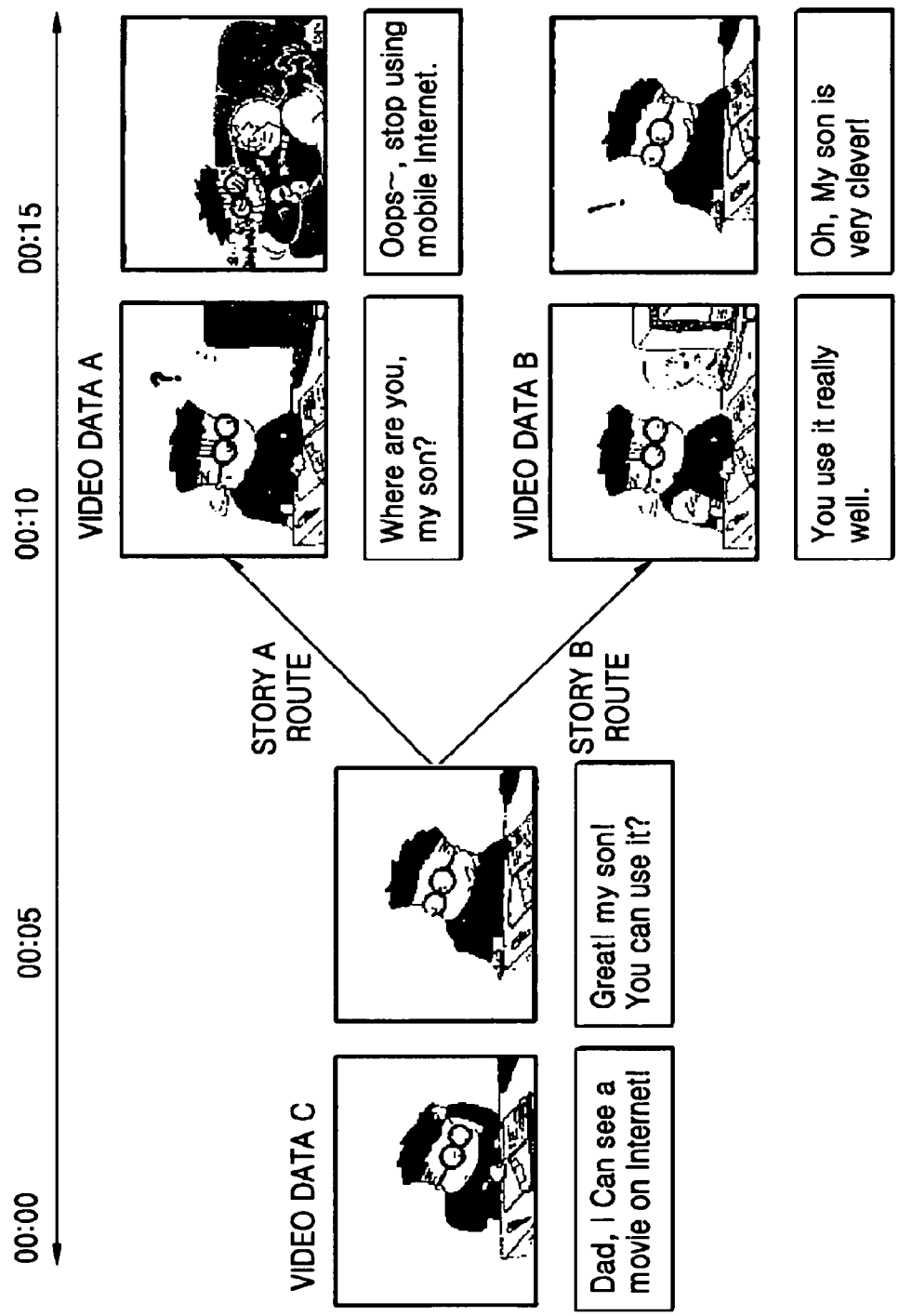
FIG. 3 is a reference diagram explaining an example of text-based subtitle information corresponding to moving picture data having a plurality of playback routes.

Referring to FIG. 3, in order to select and reproduce story A route or story B route for multiple story playback, video data A and video data B are linked to video data C.

Figure 4:
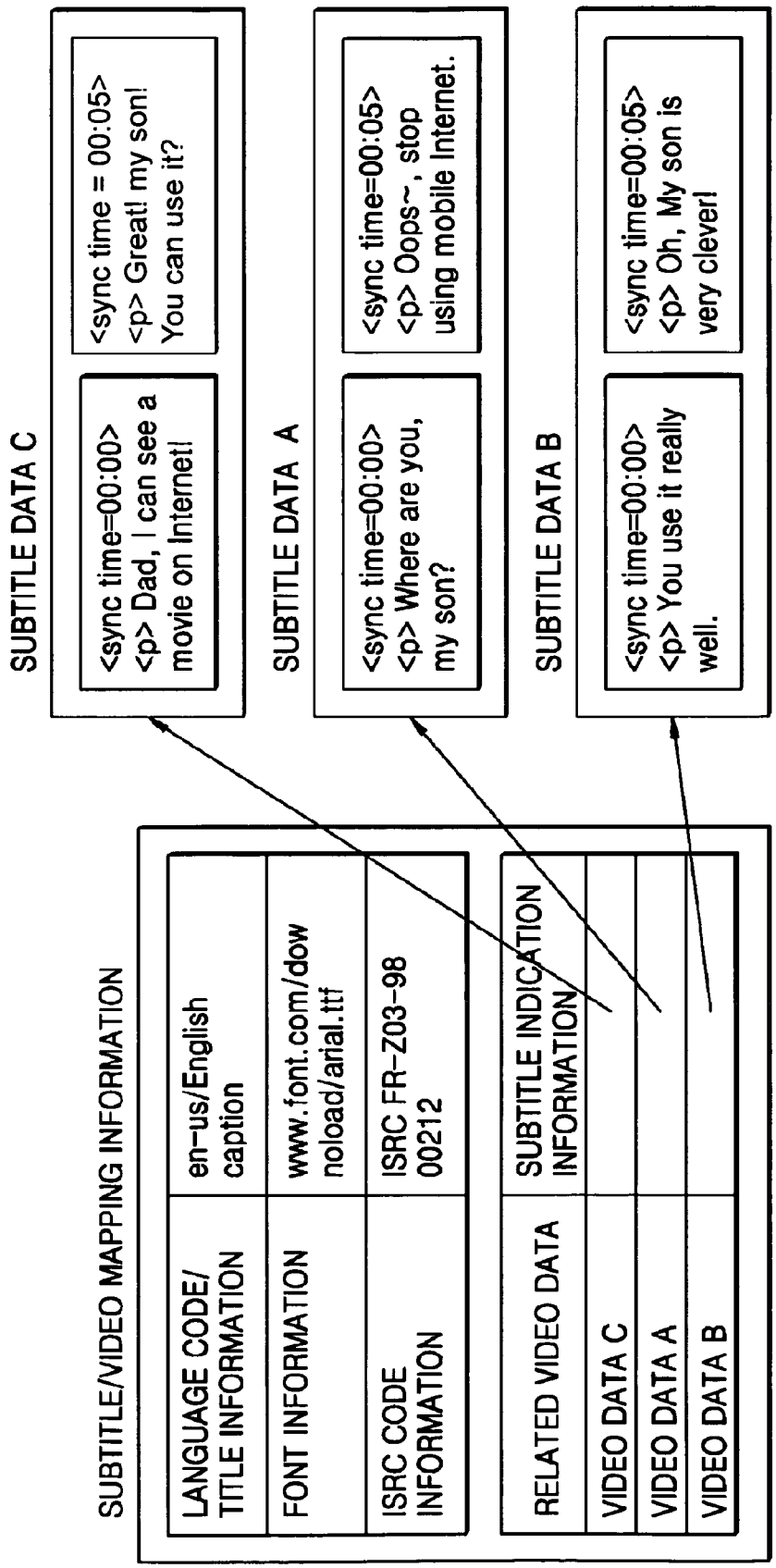
FIG. 4 is a diagram explaining an example of mapping information of moving picture data and subtitle data having the plurality of playback routes shown in FIG. 3.

FIG. 4 shows mapping information for linking moving picture data having a plurality of playback routes and a plurality of subtitle data corresponding to the moving picture data in order to support multiple story playback. The mapping information includes Subtitle Indication Information for subtitle data items A, B and C, corresponding to video data items, A, B and C, respectively,. Accordingly, where a user selects between playback of the story A route and playback of the story B route, the video data and the subtitle data corresponding to the selection may be output continuously.

Figure 5:
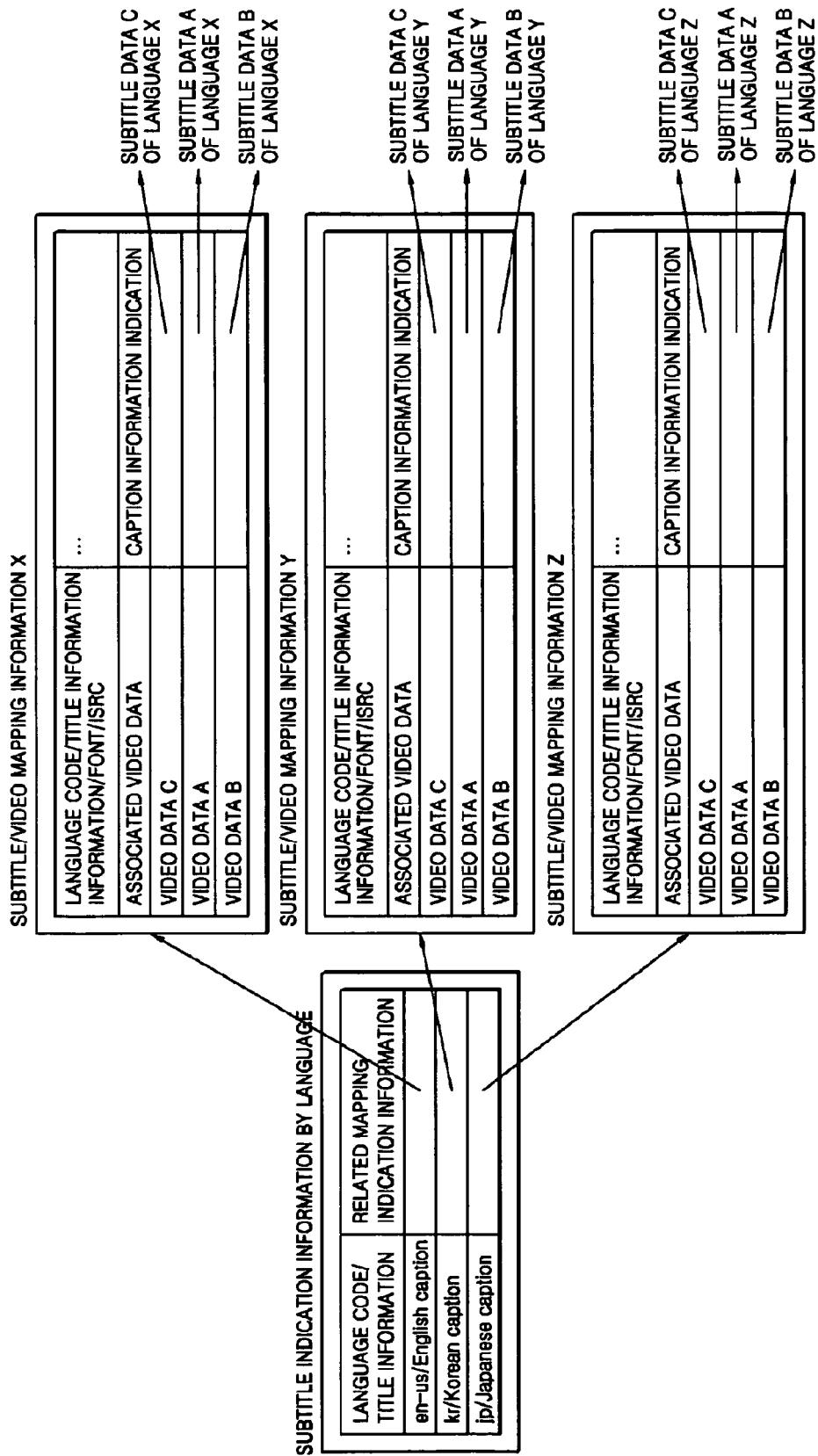
FIG. 5 is a diagram explaining an example of subtitle indication information by language corresponding to moving picture data having the plurality of playback routes.

FIG. 5 is a diagram explaining Subtitle Indication Information by language corresponding to moving picture data having a plurality of playback routes. Referring to FIG. 5, subtitle indication information by language indicates related mapping information for individual subtitle languages supported. Further, the mapping information indicates a plurality of subtitle data items corresponding to a plurality of playback routes, respectively, as described above with reference to FIG. 4.

For example, as shown in FIG. 5, if in a storage medium providing English, Korean, and Japanese subtitles, the Korean subtitle is selected by a user selection, or is set as a default, subtitle/video mapping information Y supporting the Korean subtitle is linked by a pointer of related mapping indication information. Also, a plurality of the subtitle data A, B and C written in the Korean language, are linked to A, B and C video data items having a plurality of playback routes included in subtitle/video mapping information Y, respectively. Accordingly, multiple language subtitles are supported and at the same time, multiple story playback of moving picture data having a plurality of playback routes is enabled.

Figure 6:
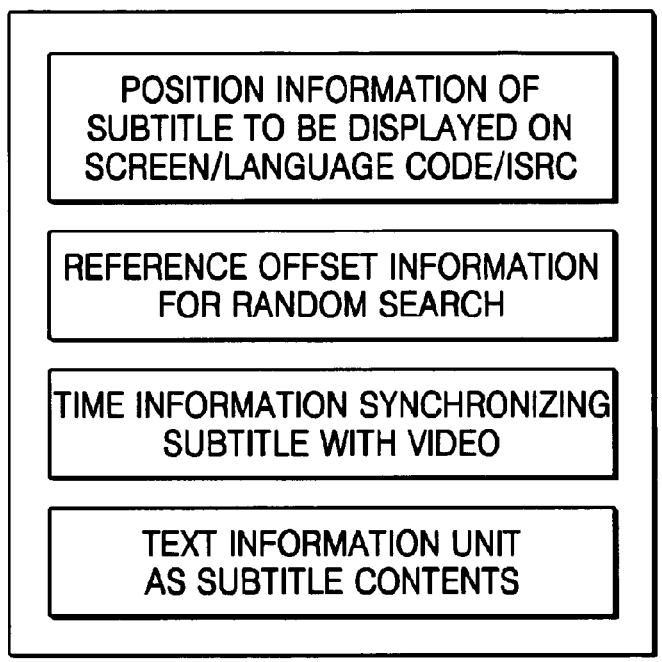
FIG. 6 is a diagram explaining an example of a structure of subtitle data.

FIG. 6 is a diagram explaining an example of a structure of subtitle data. FIG. 6 shows the structure of a plurality of subtitle data linked by related subtitle indication information included in the subtitle/video mapping information described above with reference to FIG. 4. The subtitle data includes header information, reference offset information, time information and/or text information. The header information is information on the entire subtitle data and may include position information of a subtitle to be displayed on a screen, and international standard record code (ISRC) as information on a producer or a support language code.

The reference offset information is reference information for randomly searching for a subtitle of a desired time at a high speed and reproducing the subtitle. A cell identifier (VOB-ID and CELL_ID) of a video object (VOBU) used as a recording unit of a DVD storage medium, or the starting point of a clip used as a recording unit of a bluray disc storage medium may be used as the reference offset information.

Synchronization time information synchronizing a subtitle with video data may be expressed as a lapse time from a starting point of a reference cell of a VOBU or a clip that is reference offset information of the moving picture data. In particular, synchronization time information may be expressed by using a presentation time stamp (PTS) time based on a reference time for reproducing moving pictures.

Text information indicates text data containing subtitle contents to be converted into pixel data to present a bitmap image of the text subtitle. The text information may include style information specifying an output style of pixel data and control information to control the output of the converted pixel data. The style information and control information will be explained later.

Figure 7:
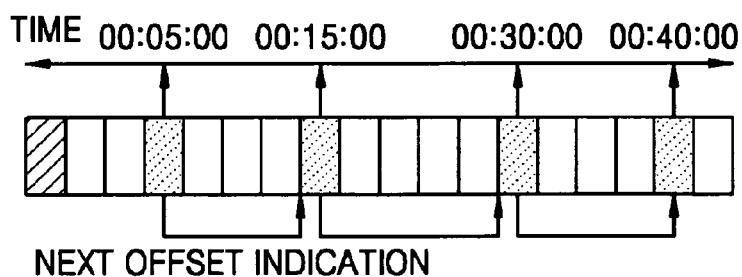
FIG. 7 is a diagram explaining an example of a usage example of each field of subtitle data having the data structure shown in FIG. 6.

FIG. 7 is a diagram explaining a usage example of each field of subtitle data having the data structure of FIG. 6. The field subtitle data shown in FIG. 7 includes position information of a subtitle to be displayed on a screen, a language code and/or ISRC information as header information. The subtitle data includes a plurality of synchronization time information items synchronizing the subtitle with video data, and a plurality of text information items of a subtitle to be used as subtitle contents. Further, the subtitle data includes reference offset information for random search for a subtitle, and each reference offset information item indicates an immediate next reference offset information item. Accordingly, by using reference offset information, a subtitle may be searched for at a high speed and synchronization time information for synchronizing a subtitle with video data can also be expressed by a lapse time from reference offset information.

The storage medium described above with respect to FIGS. 3-7 includes moving picture data having a plurality of playback routes, a plurality of subtitle data corresponding to the plurality of playback routes, and subtitle/video mapping information for multiple story playback. The subtitle data includes reference offset information for high speed random search. In order to support multiple language subtitles, subtitle indication information by language may also be included. The subtitle/video mapping information, subtitle data, and subtitle indication information by language above described may be recorded as files separate from the moving picture data, and may be recorded on a same storage medium on which moving picture data is recorded or may be recorded separately in a server or the like on the Internet.

Based on the data structure of the storage medium described above, an apparatus for reproducing the storage medium will now be described. FIG. 8 is a diagram explaining an example of a structure of a reproducing apparatus.

The reproducing apparatus shown in FIG. 8 includes a reading unit 810, a decoder 830, a subtitle processor 840, and a blender 850. Also, the reproducing apparatus may further include a buffer unit 820 temporarily storing data to buffer the data.

The reading unit 810 reads data items having the data structure described above from a storage medium or from the Internet 800, and depending on a type of each data item, stores the data in a corresponding buffer unit 820. That is, AV stream data is stored in a moving picture data buffer 822, a plurality of subtitle data items corresponding to a plurality of playback routes (Refer to FIG. 6) are stored in a subtitle data buffer 824, and subtitle/video mapping information (Refer to FIG. 4) and subtitle indication information by language (Refer to FIG. 5) are stored in a corresponding buffer 826. Further, font information of a subtitle is stored in a default font buffer 828. A resident font buffer 842 storing a resident font read from the storage medium or from the Internet and residing on a memory may also be included.

The decoder 830 decodes video stream data stored in the moving picture data buffer 822 and transmits moving pictures to be output to the blender 850. The subtitle processor 840 generates a graphic image of a subtitle to be overlaid on moving pictures to be output, and controls the output of a subtitle to be synchronized with video data. That is, the subtitle processor 840 receives subtitle data from the subtitle data buffer 824, receives mapping information from the subtitle/video mapping information buffer 826, and identifies subtitle data corresponding to the moving picture data corresponding to a selected language and a selected story route. By decoding the subtitle data, the subtitle processor 840 converts (or renders) the subtitle data into pixel data for a bitmap image and transmits the pixel data to the blender 850. By using style information included in the subtitle data, the output style of the subtitle may be controlled and by using control information included in the subtitle data, an output time of the subtitle data may be controlled to be synchronized with the video data.

Font information stored in the default font buffer 828 and/or the resident font buffer 842 may be used. A detailed structure of the subtitle processor 840 is explained below.

Rendering in general aspects of examples described herein indicates all required activities related to converting subtitle text data into graphic data to express the text data on a display apparatus. That is, the rendering indicates all processes for finding a font matching a character code of each character in text data, from download font data read from an information storage medium, or from the resident font data, converting into a graphic, and outputting on a screen.

The blender 850 receives decoded video data from the decoder 830, receives converted pixel data from the subtitle processor 840, overlays the pixel data of a subtitle on an image based on the video data, and outputs to the display apparatus 860.

FIG. 9 is a diagram explaining the structure of the subtitle processor 840 of FIG. 8 in detail. Referring to FIG. 9, the subtitle processor 840 includes a text subtitle decoder 902 and a graphic controller 904.

The text subtitle decoder 902 receives subtitle data, subtitle/video mapping information, other language information, and font information from the buffers 824 and 826, parses the subtitle/video mapping information, identifies subtitle data corresponding to the moving picture data of a route to be reproduced, parses the identified subtitle data, and converts the identified subtitle data into pixel data for a bitmap image graphic.

By using the subtitle/video mapping information and subtitle data parsed by the text subtitle decoder 902, the graphic controller 904 controls an output time and position of the converted pixel data such that the converted pixel data is output synchronized with the moving picture data.

More specifically, the text subtitle decoder 902 decodes subtitle data, and parses reference offset information indicating reference information for randomly searching at a high speed for a subtitle of a desired time among subtitle data and reproducing the subtitle; text data including subtitle contents to be converted into pixel data and then output; style information specifying an output style of pixel data; and control information for controlling the output of the converted pixel data. Based on the parsed style information, text data is converted into pixel data.

The graphic controller 904 controls based on the parsed control information to output the converted pixel data synchronized with moving picture data. An output time point or an output position may be included in the control information.

A method of reproducing subtitle data based on the data structure recorded on a storage medium and the structure of the reproducing apparatus described above will now be explained.

FIG. 10 is a flowchart illustrating an example of a method of reproducing text-based subtitle information corresponding to moving picture data having a plurality of playback routes. Referring to FIG. 10, in order to support multiple language subtitles and multiple story playback, a subtitle indication information item corresponding to a language selected by a user or set as a default in a reproducing apparatus is read among subtitle indication information by language (Refer to FIG. 5) in operation 1002. By parsing subtitle indication information corresponding to the selected language, linked subtitle/video mapping information is read in operation 1004. By parsing the read subtitle/video mapping information, subtitle data linked to video data of a route to be reproduced is read in operation 1006. Based on style information and text information included in the read subtitle data, pixel data for a bitmap image graphic is generated in operation 1008. By controlling a time and position for outputting a subtitle based on control information included in the subtitle data, the generated pixel data is output in operation 1010.

Accordingly, the subtitle of the language selected by the user or as a default setting may be reproduced along the story playback route. Subtitle indication information by language, subtitle/video mapping information, or subtitle data may be recorded on a same storage medium on which moving picture data is recorded or may be disposed separately, such as for example, on the Internet at an Internet address stored on the storage medium.

Referring to FIGS. 11 through 17, an example of implementing the mapping information and subtitle data on a DVD disc will now be explained.

On a DVD disc, a video manager (VMG) in which header information on the entire video title is recorded and a plurality of video title sets (VTS) are stored. A video object set (VOBS) is linked to the VMG. A VOBS for displaying a menu screen and a plurality of video objects (VOBs) are linked to the VTS. A VOB is formed with a plurality of Cells, and each cell is formed with a plurality of video object units (VOBUs).

In information for navigation of video data, VOBU_VOB_IDN information and VOBU_C_IDN information are recorded such that a video object to which a current VOBU unit belongs and identifier of a Cell (VOB_ID and CELL_ID) may be known. Also, cell elapsed time (C_ELTM) information is recorded such that a relative reproduction time from the first video frame of a Cell to which a current VOBU belongs, to the first video frame of the current VOBU may be known.

Figure 11:
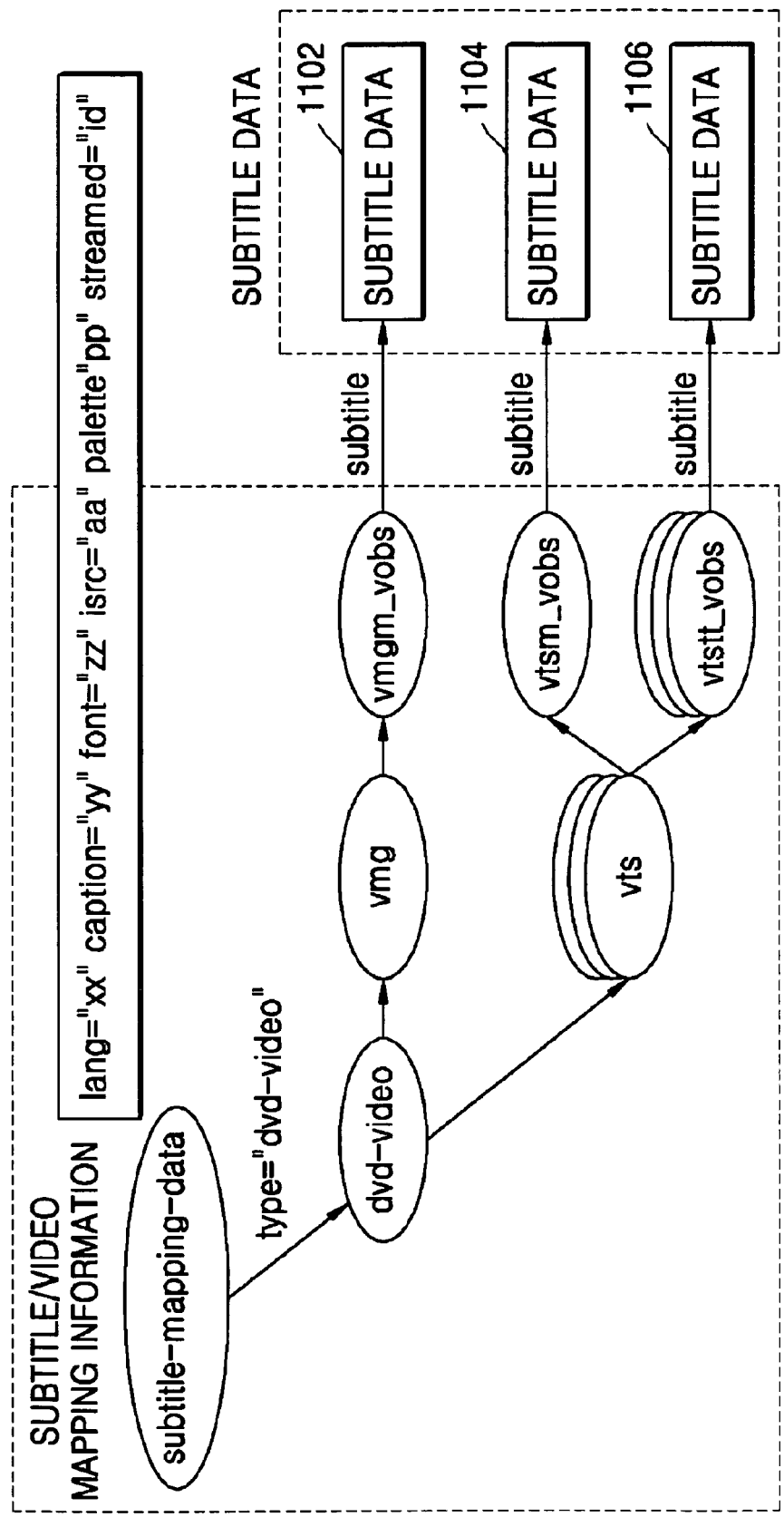
FIG. 11 is a diagram explaining an example of the data structure of mapping information shown in FIG. 4 implemented on a DVD disc.

Mapping information and the structure of subtitle data based on the DVD disc structure described above will now be explained. FIG. 11 is a diagram explaining the data structure of mapping information shown in FIG. 4 implemented on a DVD disc. Referring to FIG. 11, the DVD disc includes a video object VOB that is a recording unit of moving picture data of a DVD and indication information on subtitle data linked to the VOB.

Subtitle/video mapping information includes indication information indicating a VOBS linked to at least one or more subtitles. Also, information indicating linking relations between VOBSs is also included.

The subtitle/video mapping information includes at least one among language information (lang="xx") on which language is used to generate the subtitle data, screen display title information of a subtitle (caption="yy"), information on at least one font (font="zz"), ISRC code information of a producer who made subtitles (isrc="aa"), color table information to be used for a background color and foreground color of a subtitle character (palette "pp"), and stream number information of a text subtitle (streamed="id") to distinguish the stream number information of the text subtitle from subtitle stream data of a subpicture method in AV stream data that is moving picture data. The stream number information of a text subtitle may include, for example, a number set to SPRM (2), which is a system register of a reproducing apparatus.

FIG. 12 is a diagram showing an example of mapping information shown in FIG. 11 implemented by using a markup language on a DVD disc. As shown in FIG. 12, video object 1 in <vmg_vobs> tag is linked to a subtitle data file 1202, file://English_vmgm.text, video object 1 in <vtms_vobs> tag is linked to a subtitle data file 1204, file://English_vtsm.text, and video object 1-9 in <vtstt_vobs> tag is linked to a subtitle data file 1206, file://English_tt1vob1.text. In addition to language information, title information, font information, ISRC information, stream IDs, and color table information are included.

The example shown in FIG. 12 uses the XML method but other encoding methods may also be used for presentation. That is, the data to be used is of primary importance, and the method of expressing the data may use a markup language, a binary table, or another method. Data that may be included in subtitle/video mapping information may be arranged as follows.

FIG. 13 is a diagram showing an example of implementing the mapping information on a DVD disc in a form of a table. Referring to FIG. 13, position information 1302, 1304, and 1306 of subtitle data corresponding to a video object is included. In addition to language information, title information, font information, ISRC information, color table information, and stream ID information may be included.

In the DVD, subtitle data to be displayed overlapping a video image is encoded in a same manner as 2-dimensional graphic data. That is, in the case of a DVD, a separate encoding method to support multiple languages is not employed and data for each subtitle is converted into pixel data for a bitmap image graphic, and then the pixel data is processed by one encoding method and recorded. Graphic data for a subtitle is referred to as a subpicture. A subpicture is formed with a subpicture unit (SPU) corresponding to one sheet of graphic data. As output control information to output pixel data, output starting time information, color information of pixel data, information on contrast with video data, and information on an output time and a finish time are included.

Figure 14:
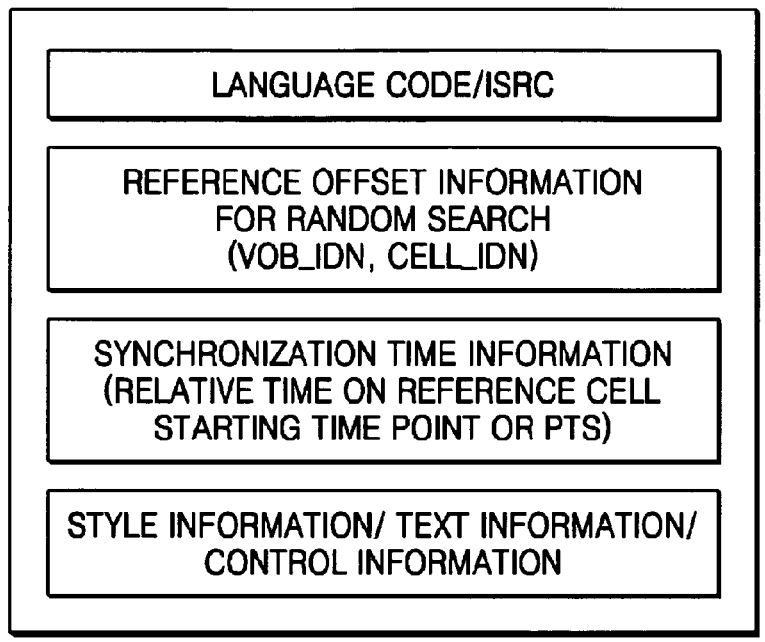
FIG. 14 is a diagram explaining an example of the structure of subtitle data shown in FIG. 6 implemented on a DVD disc.

FIG. 14 is a diagram explaining the structure of subtitle data shown in FIG. 6 implemented on a DVD disc. Referring to FIG. 14, the structure of the subtitle data shown in FIG. 6 includes header information, reference offset information, time information and/or text information. The header information and text information are the same as explained with reference to FIG. 6 and a description thereof will not be repeated.

However, the reference offset information is reference information to randomly search for a subtitle of a desired time at a high speed and reproduce the subtitle, and uses the cell identifier (VOB_IDN and CELL_IDN) of the video object (VOB) described above, which is used as a recording unit of a DVD storage medium. Also, as synchronization time information, a lapse time from a starting time point of a reference cell is used. In particular, synchronization time information may be expressed by using a presentation time stamp (PTS) time based on a reference time to reproduce moving pictures. Style information specifying the output style of pixel data and control information for controlling output of converted pixel data may also be included. The style information and control information will be explained below.

Figure 15A:
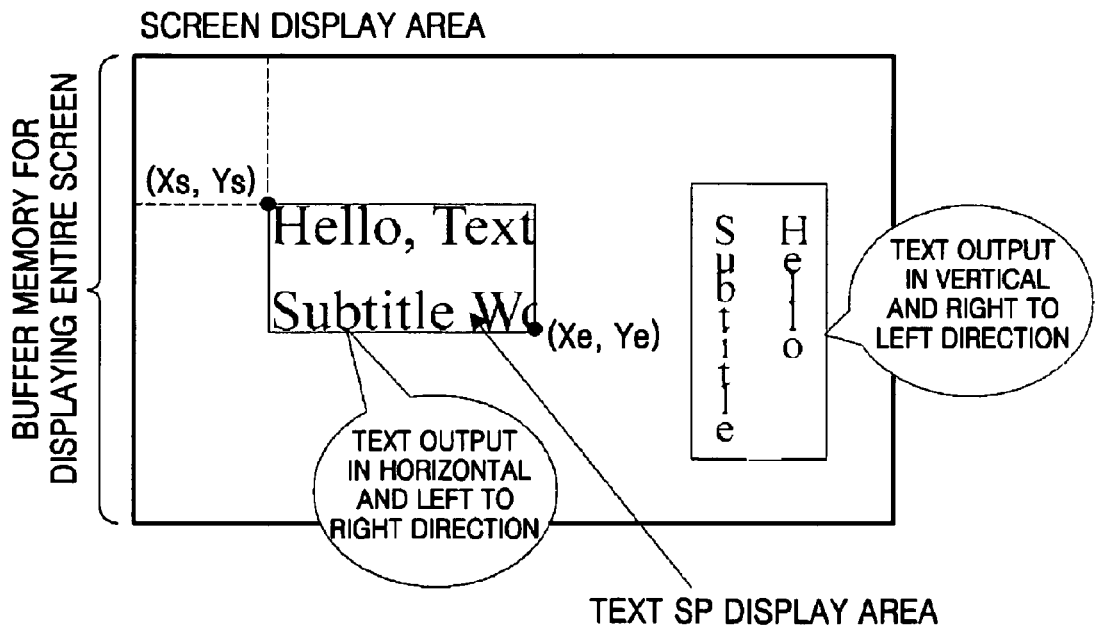
FIGS. 15A and 15B are diagrams showing an example of the subtitle data shown in FIG. 6 implemented on a DVD disc displayed on a screen.
Figure 15B:
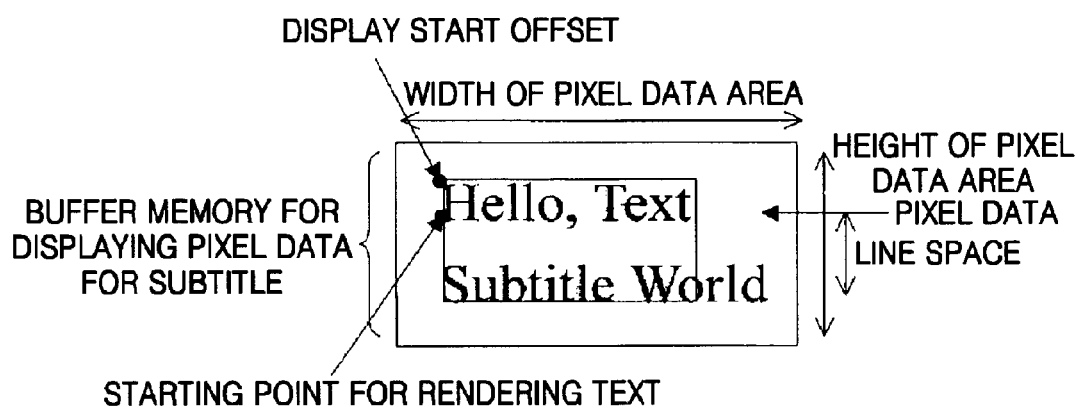

FIGS. 15A and 15B are diagrams showing an example of subtitle data implemented on a DVD disc displayed on a screen.

In a DVD, pixel data is losslessly coded and information on a position at which a subpicture of a subtitle is displayed (SP display area) in an area to display the entire screen, and information for controlling an output start time and finish time, an output direction, and line spacing are included. In a DVD, subpicture data for subtitle data of a maximum of 32 different languages may be multiplexed together with moving picture data and recorded. Each language is distinguished by a stream id provided by the MPEG system coding method, and a sub stream id defined by the DVD. Accordingly, if a user selects one language, the corresponding subpicture unit (SPU) is extracted by taking only subpictures (SP_PCK) having the stream id and sub stream id corresponding to the language, and then, by decoding the subpicture unit (SPU), subtitle data is extracted and according to output control information, the output is controlled.

Referring to FIGS. 15A and 15B, a method of displaying the text-based subtitle constructed to have compatibility with the subpicture method of a DVD disc is shown. The subtitle data described with reference to FIG. 14 is parsed by the subtitle processor 840 of FIG. 8 and converted into pixel data having an output image as shown in FIGS. 15A and 15B, and transferred to the blender 850. Accordingly, the reproducing apparatus shown in FIG. 8 receives the pixel data for a bitmap image as the conventional bitmap-based subpicture data, synchronizes the pixel data with the video data and outputs an image corresponding to the video data and the synchronized pixel data on the screen. As a result, without modifying the structure of the conventional decoder 830, a subtitle may be processed to be compatible with the conventional subpicture method.

The text-based subtitle data described above may comprise the following structure in order to be compatible with the subpicture method of a DVD as described above.

FIG. 16 is a diagram showing an example of subtitle data implemented by a markup language on a DVD. Referring to FIG. 16, when text-based subtitle data is randomly searched for, in order to search for the data at a high speed the storage medium uses a video object number (VOB_IDN), a cell number (CELL_IDN), and a lapse time from a cell (time) as reference offset information (1600). Information indicating next reference offset information (next) is included. Text information including the contents of a subtitle and style information indicating an output style are included (1602 and 1606). Control information for outputting pixel data obtained by converting a text subtitle after synchronization with video data is also included (1604 and 1608).

In order to generate the pixel data as shown in FIGS. 15A and 15B based on the subtitle data of FIG. 16, style information as the following is included in the text-based subtitle data according to general aspects of examples described herein.

Style information included in subtitle data may also include information on a width and a height of a pixel data area to indicate the size of the pixel data. Also included are information on a color of a background screen of pixel data rendering subtitle text, time information on when pixel data is to be generated and deleted in the buffer memory of pixel data, information on a starting point from which the first line of subtitle text begins, information on line spacing when a plurality of lines of subtitle text are output, information indicating whether the output direction of text is from left to right or from right to left, or in the vertical or horizontal direction, information on the shape, such as size, bold and Italic, of subtitle text, line break information, and character code change information.

The subtitle processor 830 parses style information in subtitle data having the information described above and controls the output style of the subtitle text. In order to control so that pixel data converted by applying the style information described above is synchronized with video data and output on the screen, the following control information is included.

The control information in the subtitle data used to generate the pixel data shown in FIGS. 15A and 15B includes position information ((Xs,Ys), (Xe,Ye)) specifying an area to output the pixel data on the screen, information on a starting point in the pixel data area corresponding to the first starting point of a text subpicture display area (Text SP Display Area) shown in FIG. 15A, and time information on when the bitmap image of pixel data appears and disappears on the screen.

FIG. 16 illustrates subtitle data information 1600 which, when vob_id is any one of 1 to 5 and cell_id is 1, a subtitle is output by calculating a synchronization time (sync time) based on vob_idn=1-5 and cell_idn=1. That is, by using a lapse time (time) from the video object number (VOB_IDN) and cell number (CELL_IDN) that are reference offset information, when text-based subtitle data is randomly searched for, retrieval may be quickly performed.

A <text> tag indicates style information and subtitle text information and a <pixmap> tag indicates control information for outputting pixel data.

As 'begin' or 'end' information of the <pixmap> tag or the <text> tag, a lapse time from a Cell or PTS time information calculated from the standard time clock (STC) described above is appropriate. Also, 'start' information of the <text> tag indicates address information of a starting point from which text is rendered, and 'start' information of the <pixmap> tag indicates information on an address from which the pixel data is to be output.

In addition, as an example of control information, synchronization time information for outputting subtitle data synchronized with video data may be expressed as a lapse time from a reference cell of a video object, and in particular, screen output time (Presentation Time Stamp, PTS) information based on the STC used by a reproducing apparatus to reproduce video data may be used.

The example shown in FIG. 16 uses the XML method. However, the contents of subtitle data including style information and control information, reference offset information and header information, described above may be expressed by other encoding methods.

Figure 17:
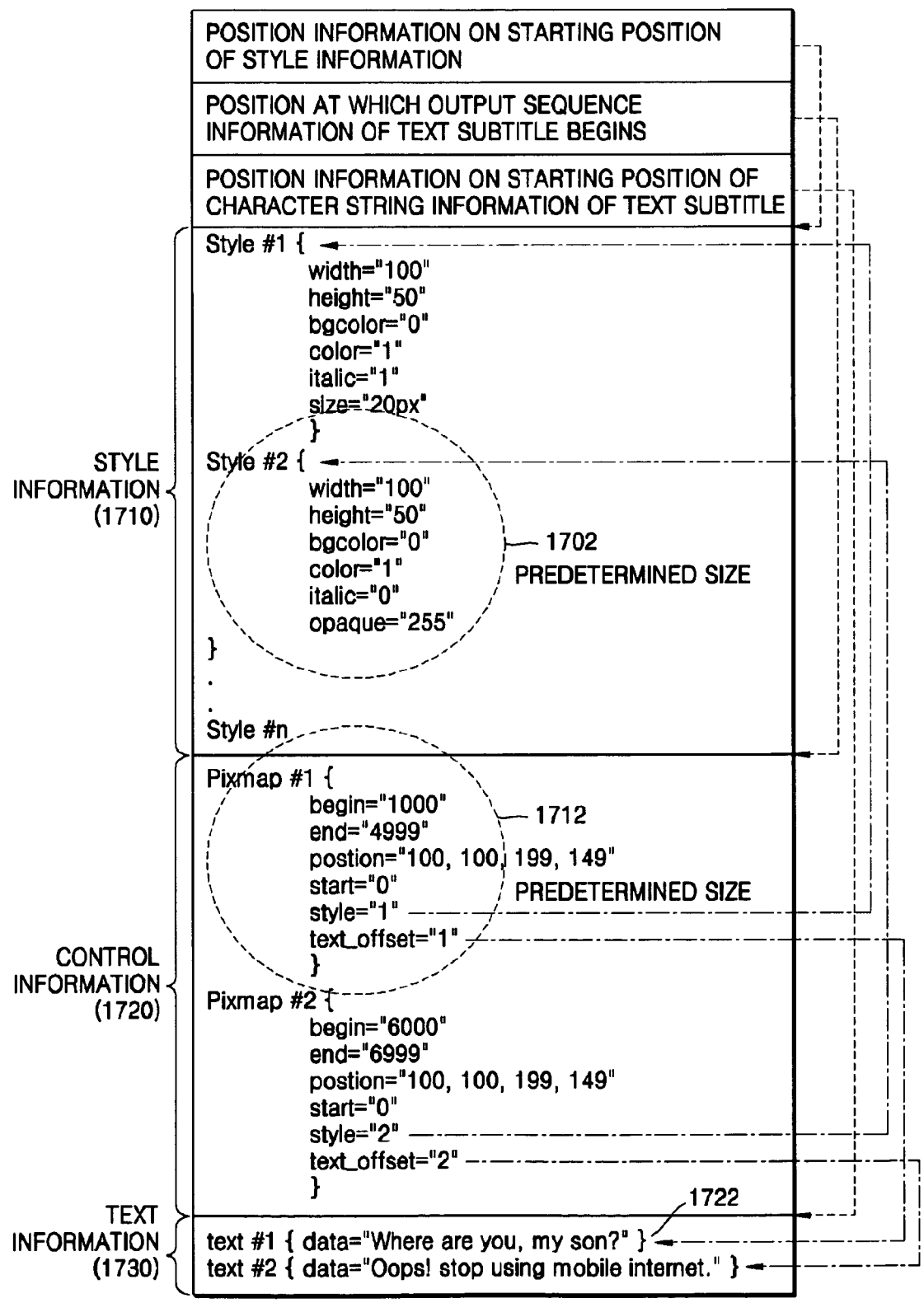
FIG. 17 is a diagram showing an example of the subtitle data shown in FIG. 6 implemented in a binary table on a DVD disc.

A case where subtitle data is expressed by a binary table method will now be explained. FIG. 17 is a diagram showing an example of subtitle data implemented in a form of a binary table on a DVD disc. Referring to FIG. 17, unlike in FIG. 16, an example of subtitle implemented in the form of a binary table shape is shown. As shown in FIG. 17, subtitle data includes style information 1710, control information 1720, text information 1730, and header information indicating starting positions of the style information 1710, the control information 1720 and the text information 1730. Pixmap #1 (1712) is an example of control information 1720 and includes information indicating a position of style information (style='1') and a position of text information (text_offset='1'). Accordingly, corresponding subtitle text information may be found and by applying the style information 1710, pixel data may be generated and based on the control information 1720, the output of the generated pixel data may be controlled.

In particular, by implementing each of the style information 1710 and the control information 1720 to have a predetermined size and to be stored sequentially in a predetermined area, search time for random search and reproduction is reduced compared to the conventional XML structure such as SAMI technology and Real-text technology, such that efficiency of search is enhanced.

Referring to FIGS. 18 through 24, an example of implementing mapping information and subtitle data on a bluray disc will now be explained.

In a bluray disc, an AV stream in which moving picture data is recorded is divided into clip units and recorded. In addition, according to a presentation method similar to the subpicture method of a DVD, subtitle data is converted into pixel data based on a bitmap and processed.

Implementing the data structure of subtitle data and mapping information shown in FIG. 4 on the bluray disc structure will now be explained.

Figure 18:
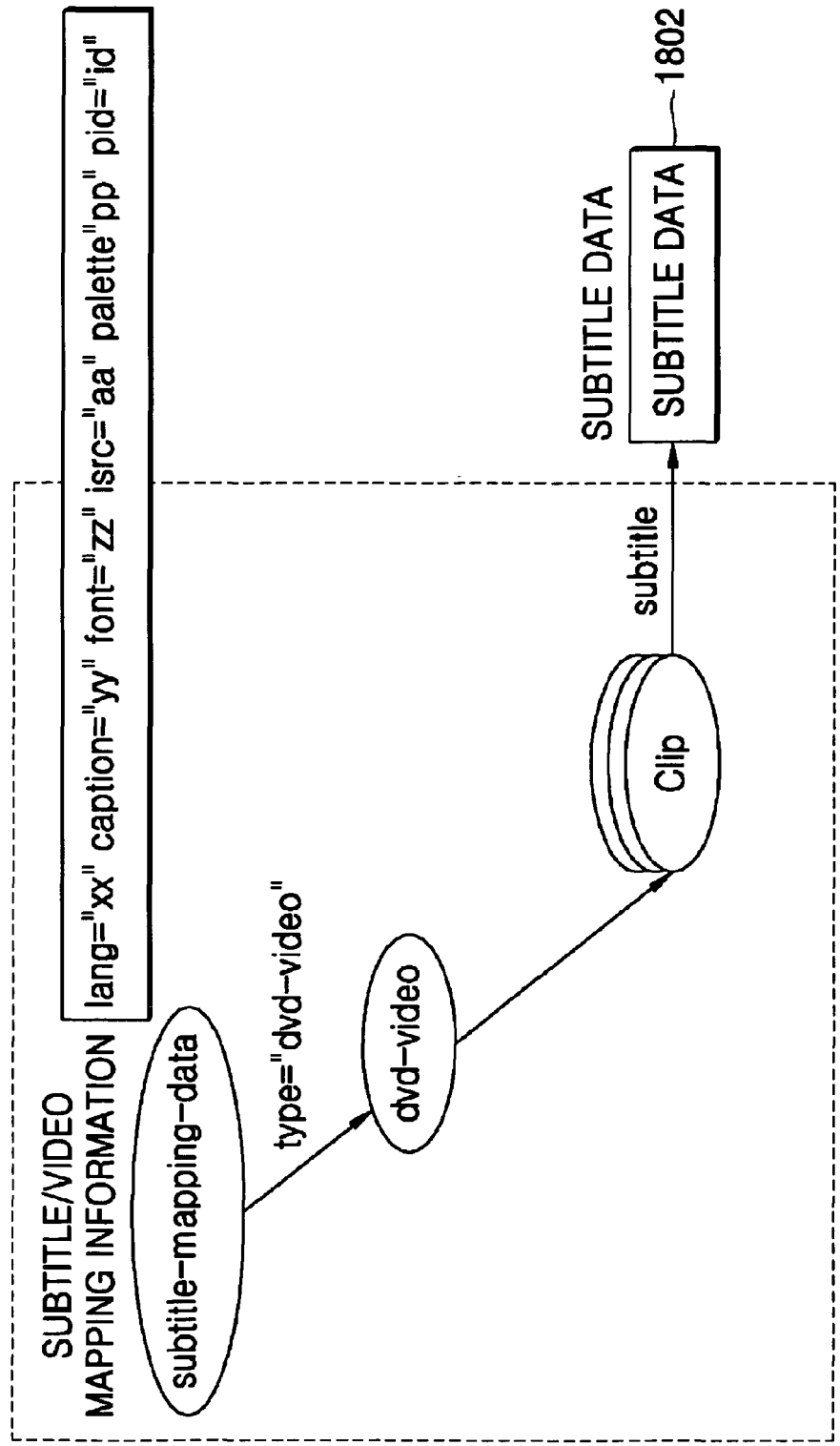
FIG. 18 is a diagram explaining an example of the data structure of the mapping information shown in FIG. 4 implemented on a bluray disc.

Referring to FIG. 18, a storage medium includes a clip that is a recording unit of moving picture data of a bluray disc and indication information indicating subtitle data 1802 linked to the clip.

Subtitle/video mapping information includes indication information indicating a clip linked to at least one or more subtitles. The subtitle/video mapping information includes language information (lang="xx") on which language is used for subtitle data, screen display title information of a subtitle (caption="yy"), information on at least one or more fonts (font="zz"), ISRC code information of a producer making the subtitle (irsc="aa"), color table information to be used for a background color and a foreground color of a subtitle character (palette "pp"), and information on a packet identifier (PID) number of a text subtitle (pid="id") to distinguish from subtitle stream data in the subpicture method in AV stream data that is moving picture data. The PID number information of a text subtitle can include, for example, a number set to PSR (2), which is a Player Status Register.

FIG. 19 is a diagram showing an example of mapping information shown in FIG. 18 implemented by using a markup language on a bluray disc. As shown in FIG. 19, subtitle clip file 0001 in <blu-ray-video> tag is linked to subtitle data file 1902, 'english_0001.text.' Additionally, language information, title information, font information, ISRC information, information on the PID number of a subtitle, and color table information are included.

The example shown in FIG. 19 uses the XML method but other encoding methods may also be used for presentation. That is, the data to be used is of primary importance, and the method of expressing the data may use a markup language, or a binary table, or another method.

Data included in subtitle/video mapping information may be arranged as follows. FIG. 20 is a diagram showing an example of the mapping information described in a form of a table implemented on a bluray disc. Referring to FIG. 20, position information of subtitle data corresponding to a video clip is included (2002). Additionally, language information, title information, font information, ISRC information, color table information, and stream ID information may be included.

Figure 21:
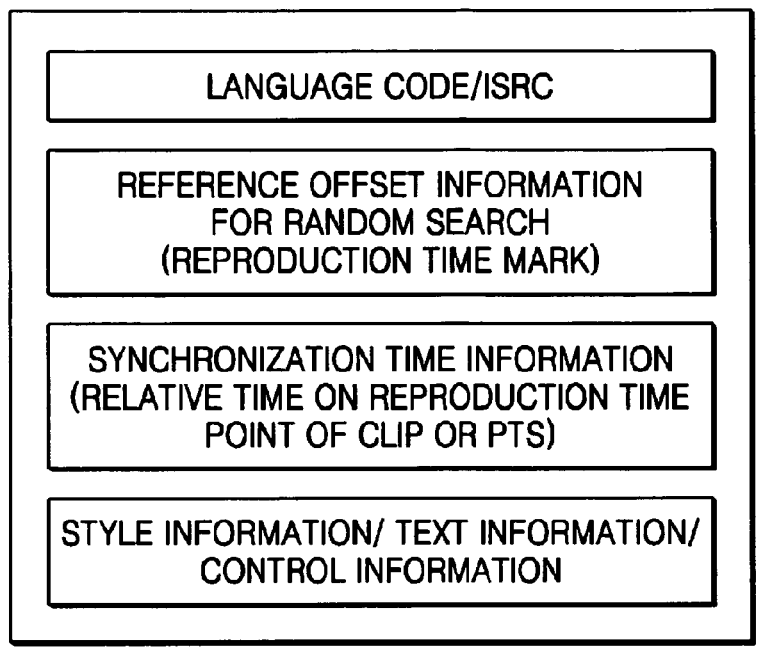
FIG. 21 is a diagram explaining an example of the structure of the subtitle data shown in FIG. 6 implemented on a bluray disc.

FIG. 21 is a diagram explaining a structure of the subtitle data shown in FIG. 6 implemented on a bluray disc. As shown in FIG. 21, subtitle data includes header information, reference offset information, time information and/or text information. The header information and text information are the same as explained above with reference to FIG. 6.

However, the reference offset information is reference information to randomly search for a subtitle of a desired time at a high speed and reproduce the subtitle, and uses reproduction time information (presentation time stamp, PTS) of the start position of a clip described above, which is used as a recording unit of a bluray disc storage medium. Also, as synchronization time information, a relative time to a starting time point of reproduction of a clip is used. In particular, synchronization time information may be expressed by using a presentation time stamp (PTS) time based on a reference time to reproduce moving pictures.

Additionally, style information specifying the output style of pixel data and control information for controlling output of converted pixel data may be included. The style information and control information are explained below.

Figure 22A:
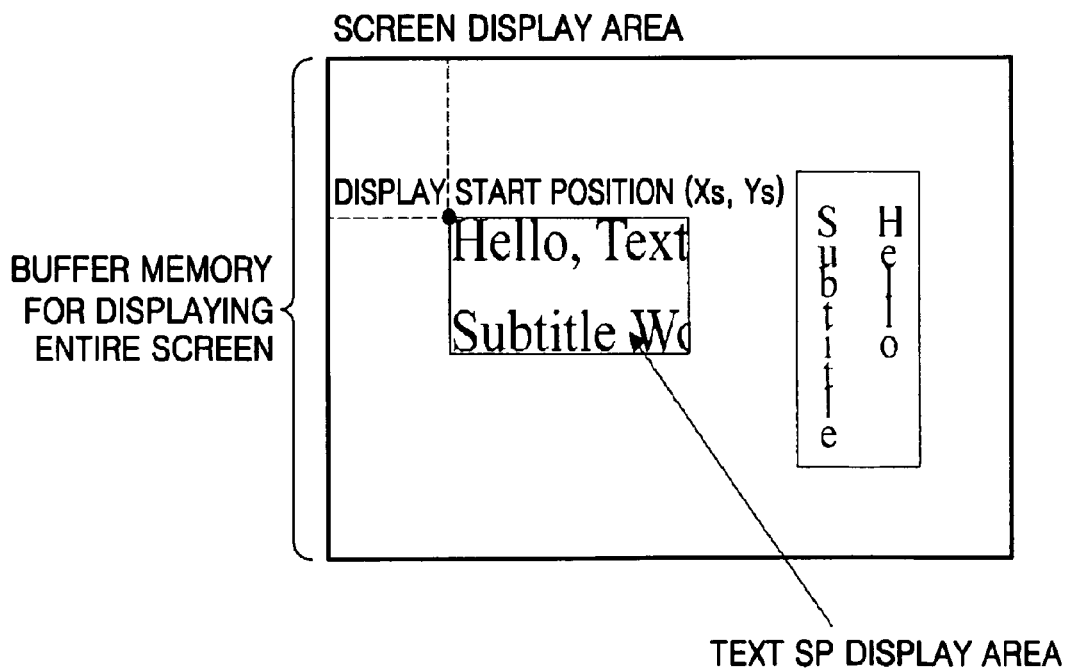
FIGS. 22A and 22B are diagrams showing an example of the subtitle data shown in FIG. 6 implemented on a bluray disc displayed on a screen.
Figure 22B:
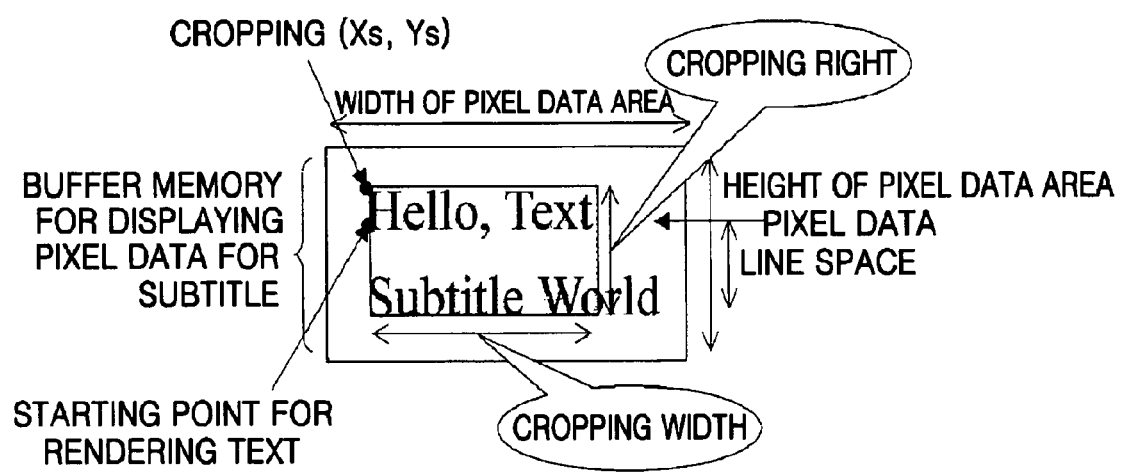

FIGS. 22A and 22B are diagrams showing an example of subtitle data implemented on a bluray disc displayed on a screen. Referring to FIGS. 22A and 22B, the subtitle data described with reference to FIG. 21 is parsed by the subtitle processor 840 shown in FIG. 8 and converted into pixel data having an output image as shown in FIGS. 22A and 22B, and transferred to the blender 850. Accordingly, the reproducing apparatus receive the pixel data for a bitmap image as the conventional bitmap-based presentation data of a bluray disc, synchronize the pixel data with video data and output the synchronized pixel data and the video data on the screen. As a result, without modifying the structure of the conventional decoder 830, a subtitle may be processed to be compatible with the conventional presentation method of a bluray disc.

The text-based subtitle data described above has the following structure in order to be compatible with the presentation method of a bluray disc as described above. FIG. 23 is a diagram showing an example of subtitle data implemented by a markup language on a bluray disc. Referring to FIG. 23, when the text-based subtitle data is randomly searched for, in order to search for the data at a high speed a storage medium uses the reproduction start time point (sync-offset value) of a video clip. Also, information indicating next reference offset information (next) is included. Also, text information including the contents of a subtitle and style information indicating an output style are included (2302 and 2306). Further, control information for outputting pixel data obtained by converting a text subtitle after synchronization with video data is also included (2304 and 2308).

In order to generate the pixel data as shown in FIGS. 22A and 22B based on the subtitle data of FIG. 23, style information described with reference to FIG. 16 may be included in the text-based subtitle data. The subtitle processor 830 parses the style information in subtitle data having the information described above and controls the output style of subtitle text.

In order to control synchronization of the pixel data converted by applying the style information described above with the video data and to output the synchronized pixel data and video data on the screen, the following control information is included.

Control information included in the subtitle data may include position information (cropping) specifying an area to be actually output on the screen among pixel data, information on a starting point (pixmap position) in a pixel data area corresponding to the first starting point of a text subpicture display area (Text SP Display Area) shown in FIG. 22A, and time information (composition begin end) on when the bitmap image of pixel data appears and disappears on the screen.

In FIG. 23, subtitle data information for outputting a subtitle in which a reproduction start time of a clip is '0' is shown. That is, by using the reproduction start time information of a clip that is reference offset information, when text-based subtitle data is randomly searched for, retrieval is quickly performed.

Also, <text> tag indicates style information and subtitle text information and <composition> tag indicates control information for outputting pixel data.

As 'begin' or 'end' information of <composition> tag or <text> tag, a lapse time from a reproduction start time of a clip or PTS time information calculated from the standard time clock (STC) described above is appropriate. Also, 'start' information of <text> tag indicates address information of a starting point from which text is rendered and 'position' information of <pixmap> tag indicates information on an address from which pixel data is to be output.

In addition, as an example of control information, synchronization time information for outputting subtitle data synchronized with video data may be expressed as a relative time based on the reproduction start time point of a video clip, and in particular, screen output time (Presentation Time Stamp, PTS) information based on a STC used by a reproducing apparatus to reproduce video data may be used.

The example shown in FIG. 23 uses the XML method. However, the contents of subtitle data including style information and control information, reference offset information and header information, described above may be expressed by other encoding methods. A case where subtitle data is expressed by a binary table method will now be explained.

Figure 24:
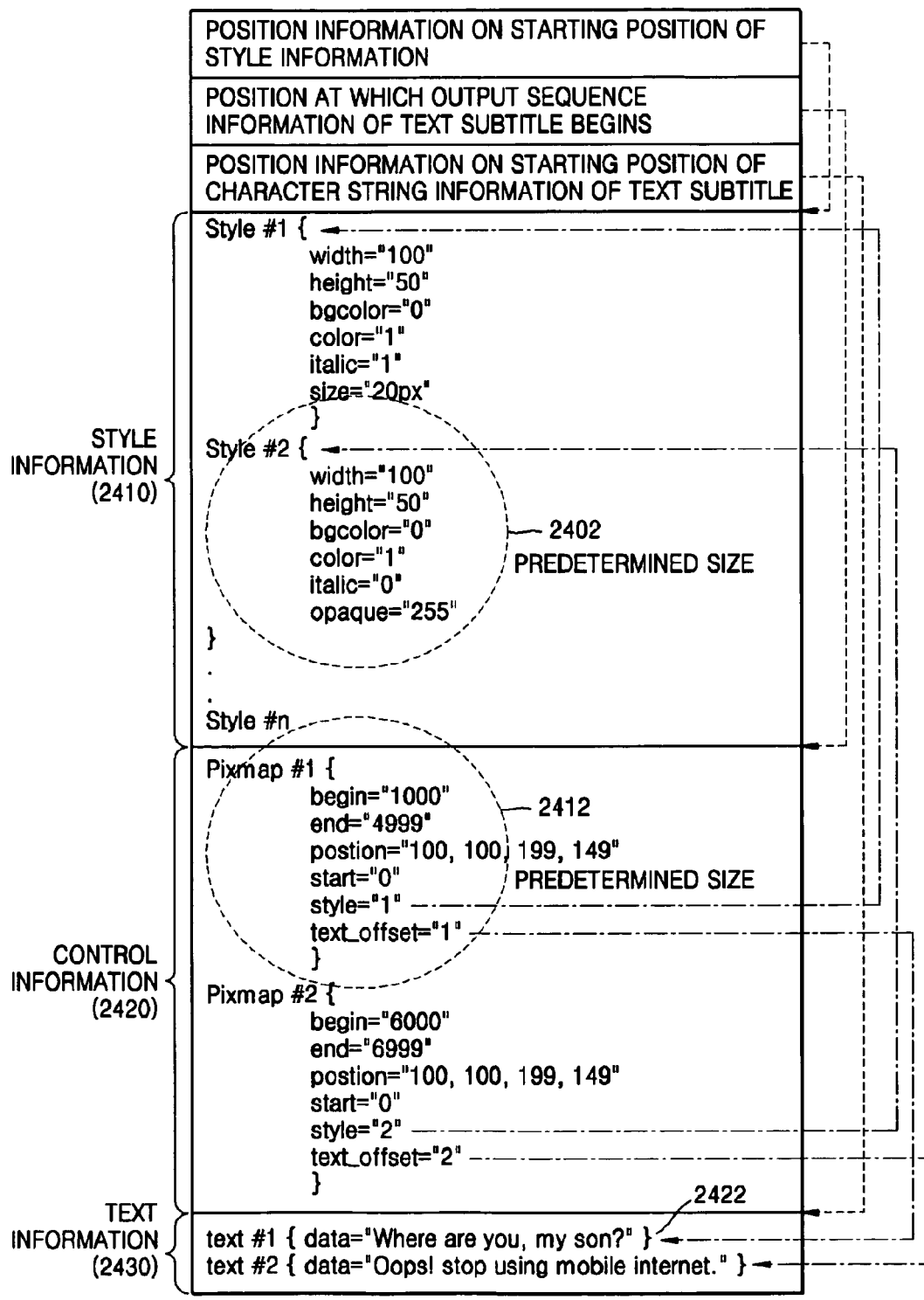
FIG. 24 is a diagram showing an example of the subtitle data shown in FIG. 6 implemented in a binary table on a bluray disc.

FIG. 24 is a diagram showing an example of subtitle data implemented in a form of a binary table on a bluray disc.

Referring to FIG. 24, an example of subtitle data implemented in the form of a binary table shape is shown. As shown in FIG. 24, the subtitle data includes style information 2410, control information 2420, and text information 2430, and includes header information indicating starting positions of these information items. The detailed structure is explained above with reference to FIG. 17.

In particular, by implementing each of the style information and control information to have a predetermined size and to be stored sequentially in a predetermined area, search time for random search and reproduction is reduced compared to the conventional XML structure such as SAMI technology and Real-text technology, such that efficiency of search is enhanced.

General aspects of examples described herein can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, by using the mapping information and the subtitle data file structure according to general aspects of examples described herein, subtitle information compatible with a bitmap image method such as the subpicture method of a DVD and the presentation method of a bluray disc, and based on text corresponding to moving picture data having a plurality of playback routes can be provided.

By including reference offset information in a subtitle data file, when random search or reproduction is performed the time for searching for a subtitle may be reduced such that search efficiency is enhanced.

Although a few examples have been shown and described, it would be appreciated by those skilled in the art that changes may be made in this embodiment without departing from the principles and spirit of examples described herein, the scope of which is defined in the claims and their equivalents.

The invention claimed is:

1. A non-transitory computer-readable storage medium, comprising:
   moving picture data comprising a plurality of playback routes;
   a plurality of items of subtitle data corresponding to the playback routes, the subtitle data being configured to support a random search for a subtitle, the subtitle data comprising reference offset information indicating reference information configured to:
   randomly search for a subtitle of a desired time at a high speed; and
   reproduce the subtitle of the desired time; and
   mapping information configured to link the moving picture data and the subtitle data.

2. The non-transitory computer-readable storage medium of claim 1, wherein the subtitle data further comprises:
   text data comprising subtitle contents that are to be converted into pixel data and output;
   style information specifying an output style of the pixel data; and
   control information configured to control the output of the pixel data.

3. The non-transitory computer-readable storage medium of claim 1, wherein, by using information on a time elapsed from the reference offset information, the subtitle of the desired time is configured to be randomly searched for at the high speed among the subtitle data.

4. The non-transitory computer-readable storage medium of claim 1, wherein the reference offset information comprises:
   a cell identifier (VOB_ID and CELL_ID) of a video object that is a recording unit of the storage medium;
   a start position of a clip that is a recording unit of the storage medium; or
   a combination thereof.

5. The non-transitory computer-readable storage medium of claim 2, wherein the subtitle data is described in a form of a markup language or a binary table.

6. The non-transitory computer-readable storage medium of claim 5, wherein, in response to the subtitle data being described in the form of a binary table:
   the style information, the control information, and the text data comprise respective identifiers for distinguishing each other;
   the control information comprises information indicating the style information and the text data corresponding to the control information; and
   a size of each of the style information and the control information is predetermined and sequentially recorded in a predetermined area.

7. The non-transitory computer-readable storage medium of claim 2, wherein the style information comprises:
   information items on a width and a height of an area of the pixel data, a background color, a time when the pixel data is to be stored and deleted in a buffer memory, a starting point from which subtitle text is rendered, line spacing, output direction, bold type and Italic type of subtitle text, line break, color of subtitle text, information on character code encoding, or any combination thereof.

8. The non-transitory computer-readable storage medium of claim 2, wherein the control information comprises:
   information items on an area on which the pixel data is to be output on an entire screen, a start point of subtitle text in the area, a synchronization time indicating when the pixel data is to appear and disappear in synchronization with the moving picture data, or any combination thereof.

9. The non-transitory computer-readable storage medium of claim 8, wherein the synchronization time is expressed as:
   a lapse time from a reference cell (CELL) of a video object (VOBU) that is reference offset information of the moving picture data;
   a lapse time from a start position of a clip that is reference offset information of the moving picture data, or
   a combination thereof.

10. The non-transitory computer-readable storage medium of claim 9, wherein the synchronization time is expressed by using a present time stamp (PTS) time based on a reference time for reproducing moving pictures.

11. The non-transitory computer-readable storage medium of claim 1, wherein the subtitle data, the mapping information, or any combination thereof further comprises font information describing a font of subtitle data to be displayed on a screen, information on a producer making the subtitle, packet identifier (PID) information of the subtitle data to distinguish from moving picture data, subtitle indication information by language of the subtitle data, or any combination thereof.

12. An apparatus for reproducing a storage medium on which moving picture data having a plurality of playback routes is recorded, the apparatus comprising:
   a decoder configured to decode the moving picture data having the plurality of playback routes; and
   a subtitle processor configured to:

parse reference offset information of subtitle data, the reference offset information indicating reference information configured to:
    randomly search for a subtitle of a desired time at a high speed; and
    reproduce the subtitle of the desired time;
convert subtitle data corresponding to a selected route into pixel data, by using:
    a plurality of items of the subtitle data corresponding to the plurality of playback routes, the subtitle data being configured to support a random search for a subtitle; and
    mapping information linking the moving picture data and the corresponding subtitle data;
synchronize the converted pixel data with the moving picture data; and
output the pixel data.

13. The apparatus of claim 12, wherein the subtitle processor comprises:
    a text subtitle decoder configured to:
        identify the subtitle data corresponding to the moving picture data of a route to be reproduced by parsing the mapping information; and
        convert the identified subtitle data into pixel data by parsing the subtitle data; and
    a graphic controller configured to control the pixel data by using the parsed mapping information and subtitle data such that the pixel data is synchronized with the moving picture data and output.

14. The apparatus of claim 13, wherein:
    the text subtitle decoder is further configured to:
        parse:
            the reference offset information indicating the reference information configured to:
                randomly search for the subtitle of the desired time at the high speed; and
                reproduce the subtitle of the desired time;
            text data containing subtitle contents that are to be converted into pixel data;
            style information specifying an output style of the pixel data; and
            control information to control the output of the pixel data; and
        convert the text data into pixel data based on the style information; and
    the graphic controller is further configured to:
        synchronize the pixel data with the moving picture data; and
        output the synchronized moving picture data and pixel data using the parsed control information.

15. The apparatus of claim 14, wherein the text subtitle decoder is further configured to randomly search the subtitle data for the subtitle of the desired time at the high speed by using information on a time elapsed from the parsed reference offset information.

16. The apparatus of claim 15, wherein the graphic controller is further configured to control the converted pixel data to be synchronized with the moving picture data by using synchronization time information expressed as one of:
    a lapse time from a reference cell (CELL) of a video object (VOBU) that is reference offset information of the moving picture data; and
    a lapse time from a start position of a clip that is reference offset information of the moving picture data.

17. A method of reproducing data on a storage medium, the storage medium including moving picture data having a plurality of playback routes, a plurality of items of subtitle data corresponding to the playback routes, the subtitle data being configured to support random search for a subtitle, and mapping information linking the moving picture data and the subtitle data, the method comprising:
    parsing reference offset information of the subtitle data, the reference offset information indicating reference information to randomly search for a subtitle of a desired time at a high speed, and reproduce the subtitle of the desired time;
    reading subtitle data corresponding to moving picture data of a route to be reproduced by parsing the mapping information;
    identifying a position of the subtitle data to be reproduced according to continuous reproduction or reproduction by random search, by parsing the subtitle data, and converting the subtitle data to be reproduced into pixel data; and
    synchronizing the pixel data with the moving picture data and outputting the pixel data.

18. The method of claim 17, further comprising combining the pixel data with the moving picture data to display subtitles on a screen.

19. The non-transitory computer-readable storage medium of claim 1, wherein the moving picture data of the each playback route and the corresponding items of the subtitle data are linked using a markup language.

20. The non-transitory computer-readable storage medium of claim 1, wherein the moving picture data and each playback route and the corresponding subtitle data are linked using a table.

21. The non-transitory computer-readable storage medium of claim 20, wherein the table comprises a binary table.

* * * * *